(12) United States Patent
Yang et al.

(10) Patent No.: US 10,178,706 B2
(45) Date of Patent: Jan. 8, 2019

(54) METHOD AND DEVICE FOR ASSOCIATING USER WITH GROUP

(71) Applicant: Huawei Technologies Co., Ltd., Shenzhen (CN)

(72) Inventors: Yanmei Yang, Beijing (CN); Cuili Ge, Beijing (CN); Yizhuang Wu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/812,795

(22) Filed: Nov. 14, 2017

(65) Prior Publication Data
US 2018/0070401 A1 Mar. 8, 2018

Related U.S. Application Data

(63) Continuation of application No. PCT/CN2015/079081, filed on May 15, 2015.

(51) Int. Cl.
*H04B 7/00* (2006.01)
*H04W 76/15* (2018.01)
(Continued)

(52) U.S. Cl.
CPC .......... *H04W 76/15* (2018.02); *H04L 29/06* (2013.01); *H04L 29/06088* (2013.01);
(Continued)

(58) Field of Classification Search
CPC ....... H04W 76/15; H04W 76/10; H04W 4/08; H04W 4/10; H04L 29/06; H04L 29/06088; H04L 65/4061
See application file for complete search history.

(56) References Cited

U.S. PATENT DOCUMENTS

| | | | | |
|---|---|---|---|---|
| 5,133,082 A | * | 7/1992 | White | H04B 1/40 340/9.1 |
| 8,112,106 B2 | * | 2/2012 | Wu | H04W 4/10 455/518 |

(Continued)

FOREIGN PATENT DOCUMENTS

| | | |
|---|---|---|
| CN | 101505295 A | 8/2009 |
| CN | 103888911 A | 6/2014 |

(Continued)

OTHER PUBLICATIONS

"MCPTT Group affiliation," 3GPP TSG-SA WG6 Meeting #3, San Jose del Cabo, Mexico, S6-150286 (revision of S6-150274), 3rd Generation Partnership Project, Valbonne, France (Apr. 13-17, 2015).

(Continued)

*Primary Examiner* — Dominic E Rego
(74) *Attorney, Agent, or Firm* — Leydig, Voit & Mayer, Ltd.

(57) ABSTRACT

Embodiments of the present invention provide a method and a device for associating a user with a group. The method includes: receiving, by a first communications device, a first association request sent by a second communications device, where the first association request includes an identifier of an MCPTT user and identifiers of N MCPTT groups, and N is a positive integer; associating the MCPTT user with M MCPTT groups of the N MCPTT groups according to association subscription information of the MCPTT user; and sending a first association response to the second communications device, where the first association response is used to indicate that the MCPTT user is successfully associated with the M MCPTT groups of the N MCPTT groups, $1 \leq M \leq N$, and M is an integer. In this way, the (Continued)

MCPTT user is associated with the M MCPTT groups that the MCPTT user is interested in.

13 Claims, 11 Drawing Sheets

(51) Int. Cl.
 *H04L 29/06* (2006.01)
 *H04W 76/10* (2018.01)
 *H04W 4/08* (2009.01)
 *H04W 4/10* (2009.01)

(52) U.S. Cl.
 CPC ........... *H04L 65/4061* (2013.01); *H04W 4/08* (2013.01); *H04W 4/10* (2013.01); *H04W 76/10* (2018.02)

(56) References Cited

U.S. PATENT DOCUMENTS

| | | | |
|---|---|---|---|
| 8,166,520 B2* | 4/2012 | Holm | H04W 4/08 726/3 |
| 8,406,409 B2 | 3/2013 | Smith et al. | |
| 8,577,404 B2* | 11/2013 | Brewer | H04W 4/10 455/518 |
| 9,307,395 B2* | 4/2016 | Chien | H04W 8/186 |
| 2004/0125760 A1 | 7/2004 | Newberg et al. | |
| 2005/0164727 A1* | 7/2005 | Hasegawa | H04W 4/08 455/519 |
| 2005/0249153 A1* | 11/2005 | Park | H04W 24/00 370/328 |
| 2006/0052130 A1* | 3/2006 | Choksi | H04L 29/12339 455/552.1 |
| 2007/0026883 A1* | 2/2007 | Sung | H04W 4/10 455/518 |
| 2007/0129051 A1* | 6/2007 | Sung | H04W 76/45 455/403 |
| 2007/0150723 A1* | 6/2007 | Estable | H04L 63/0823 713/155 |
| 2007/0197248 A1 | 8/2007 | Reich et al. | |
| 2007/0224976 A1* | 9/2007 | Miyata | H04W 4/10 455/414.1 |
| 2007/0232343 A1* | 10/2007 | Park | H04W 4/10 455/518 |
| 2009/0157798 A1* | 6/2009 | Laumen | H04W 84/08 709/203 |
| 2010/0048235 A1* | 2/2010 | Dai | G11B 27/105 455/518 |
| 2010/0318517 A1 | 12/2010 | Liu et al. | |
| 2011/0092172 A1* | 4/2011 | Stille | H04W 76/45 455/90.2 |
| 2011/0219117 A1 | 9/2011 | Linder et al. | |
| 2013/0165174 A1 | 6/2013 | Crockett et al. | |
| 2013/0294324 A1 | 11/2013 | Corson et al. | |

FOREIGN PATENT DOCUMENTS

| | | |
|---|---|---|
| CN | 104618349 A | 5/2015 |
| RU | 2392770 C2 | 6/2010 |
| RU | 2474976 C2 | 2/2013 |
| WO | 2004080090 A1 | 9/2004 |

OTHER PUBLICATIONS

"3rd Generation Partnership Project; Technical Specification Group Services and System Aspects; Mission Critical Push to Talk (MCPTT) over LTE; Stage 1(Release 13)," 3GPP TS 22.179 V13.1.0, 3rd Generation Partnership Project, Valbonne, France (Mar. 2015).

\* cited by examiner

METHOD AND DEVICE FOR ASSOCIATING USER WITH GROUP

CROSS-REFERENCE TO RELATED APPLICATIONS

This application is a continuation of International Application No. PCT/CN2015/079081, filed on May 15, 2015, the disclosure of which is hereby incorporated by reference in its entirety.

TECHNICAL FIELD

Embodiments of the present invention relate to the field of communications technologies, and in particular, to a method and a device for associating a user with a group.

BACKGROUND

A mission critical push to talk (MCPTT for short) over service is a service based on a 3GPP evolved packet system (EPS for short), and may be applied to public safety and business scenarios. The MCPTT service may support communication of multiple MCPTT users (that is, a group call), where each MCPTT user can obtain the floor by means of arbitration.

In the conventional art, MCPTT users are configured to belong to a preset MCPTT group, for example, policemen or firefighting force. Then, the MCPTT users perform group communication in the preset MCPTT group, so as to better coordinate with each other to complete a task. However, an MCPTT user cannot choose to associate with an MCPTT group that the MCPTT user is interested in.

SUMMARY

Embodiments of the present invention provide a method and a device for associating a user with a group, so as to associate an MCPTT user with at least one MCPTT group that the MCPTT user is interested in.

According to a first aspect, an embodiment of the present invention provides a method for associating a user with a group, including:

receiving, by a first communications device, a first association request sent by a second communications device, where the first association request includes an identifier of an MCPTT user and identifiers of N MCPTT groups, the first association request is used to request to associate the MCPTT user with the N MCPTT groups, and N is an integer greater than or equal to 1;

associating, by the first communications device, the MCPTT user with M MCPTT groups of the N MCPTT groups according to association subscription information of the MCPTT user, where the association subscription information of the MCPTT user is used to indicate an MCPTT group that the MCPTT user can be associated with; and sending, by the first communications device, a first association response to the second communications device, where the first association response is used to indicate that the MCPTT user is successfully associated with the M MCPTT groups of the N MCPTT groups, 1≤M≤N, and M is an integer.

In a first possible implementation manner of the first aspect, the first communications device is a network device configured for deployment of a group database; or, the first communications device is a first MCPTT server, and the first MCPTT server is an MCPTT server configured to manage the MCPTT user or is an MCPTT server configured to manage the N MCPTT groups; and the second communications device is user equipment (UE for short).

In a second possible implementation manner of the first aspect, the first communications device is an MCPTT server configured to manage the N MCPTT groups, and the second communications device is an MCPTT server configured to manage the MCPTT user.

With reference to the first possible implementation manner of the first aspect, in a third possible implementation manner of the first aspect, when the first communications device is the MCPTT server configured to manage the N MCPTT groups, the associating, by the first communications device, the MCPTT user with M MCPTT groups of the N MCPTT groups according to association subscription information of the MCPTT user includes:

determining, by the first communications device according to the association subscription information of the MCPTT user, to associate the MCPTT user with R MCPTT groups of the N MCPTT groups, where 1≤R≤N, and R is an integer;

sending, by the first communications device, a second association request to the MCPTT server configured to manage the MCPTT user, where the second association request includes the identifier of the MCPTT user and identifiers of the R MCPTT groups, so that the MCPTT server configured to manage the MCPTT user determines, according to the second association request and the association subscription information of the MCPTT user, to associate the MCPTT user with the M MCPTT groups of the R MCPTT groups, where 1≤M≤R;

receiving, by the first communications device, a second association response sent by the MCPTT server configured to manage the MCPTT user, where the second association response is used to instruct to associate the MCPTT user with the M MCPTT groups of the R MCPTT groups; and associating, by the first communications device, the MCPTT user with the M MCPTT groups according to the second association response.

With reference to the first possible implementation manner of the first aspect or the second possible implementation manner of the first aspect, in a fourth possible implementation manner of the first aspect, the associating, by the first communications device, the MCPTT user with M MCPTT groups of the N MCPTT groups according to association subscription information of the MCPTT user includes:

determining, by the first communications device according to the association subscription information of the MCPTT user, to associate the MCPTT user with the M MCPTT groups of the N MCPTT groups; and associating, by the first communications device, the MCPTT user with the M MCPTT groups.

With reference to the first aspect or any one of the first to the fourth possible implementation manners of the first aspect, in a fifth possible implementation manner of the first aspect, the associating, by the first communications device, the MCPTT user with M MCPTT groups of the N MCPTT groups includes:

generating, by the first communications device, first association information, where the first association information is used to indicate an association relationship between the MCPTT user and the M MCPTT groups.

With reference to the fifth possible implementation manner of the first aspect, in a sixth possible implementation manner of the first aspect, after the generating, by the first communications device, first association information, the method further includes:

saving, by the first communications device, the first association information.

With reference to the fifth possible implementation manner of the first aspect or the sixth possible implementation manner of the first aspect, in a seventh possible implementation manner of the first aspect, when the first communications device is the MCPTT server configured to manage the MCPTT user or is the MCPTT server configured to manage the N MCPTT groups, after the generating, by the first communications device, first association information, the method further includes: sending, by the first communications device, the first association information to the network device configured for deployment of a group database, so that the network device configured for deployment of a group database saves the first association information; or when the first communications device is the MCPTT server configured to manage the MCPTT user or is the network device configured for deployment of a group database, after the generating, by the first communications device, first association information, the method further includes: respectively sending, by the first communications device, second association information to K second MCPTT servers according to the first association information, so that each second MCPTT server saves the received second association information, where $1 \leq K \leq M$, K is an integer, MCPTT groups managed by the K second MCPTT servers include the M MCPTT groups, each second MCPTT server manages at least one MCPTT group of the M MCPTT groups, and each piece of second association information is used to indicate an association relationship between the MCPTT user and the at least one MCPTT group managed by the second MCPTT server that receives the second association information; or when the first communications device is the MCPTT server configured to manage the N MCPTT groups or is the network device configured for deployment of a group database, after the generating, by the first communications device, first association information, the method further includes: sending, by the first communications device, the first association information to the MCPTT server configured to manage the MCPTT user, so that the MCPTT server configured to manage the MCPTT user saves the first association information.

With reference to the first aspect or the first to the seventh possible implementation manners of the first aspect, in an eighth possible implementation manner of the first aspect, before the associating, by the first communications device, the MCPTT user with M MCPTT groups of the N MCPTT groups according to association subscription information of the MCPTT user, the method further includes:

obtaining, by the first communications device, subscription data of the MCPTT user according to the identifier of the MCPTT user; and obtaining the association subscription information of the MCPTT user according to the subscription data of the MCPTT user; or obtaining, by the first communications device, group information of the N MCPTT groups according to the identifiers of the N MCPTT groups; and obtaining the association subscription information of the MCPTT user according to the group information of the N MCPTT groups and the identifier of the MCPTT user.

With reference to the first aspect or any one of the first to the eighth possible implementation manners of the first aspect, in a ninth possible implementation manner of the first aspect, before the associating, by the first communications device, the MCPTT user with M MCPTT groups of the N MCPTT groups according to association subscription information of the MCPTT user, the method further includes:

determining, by the first communications device according to group information of the M MCPTT groups and the identifier of the MCPTT user, that the MCPTT user is an authorized MCPTT group user of the M MCPTT groups.

According to a second aspect, an embodiment of the present invention provides a method for associating a user with a group, including:

receiving, by a first communications device via a third communications device, a first association request sent by a second communications device, where the first association request includes an identifier of an MCPTT user and identifiers of N MCPTT groups, the first association request is used to request to associate the MCPTT user with the N MCPTT groups, and N is an integer greater than or equal to 1;

determining, by the first communications device according to association subscription information of the MCPTT user, to associate the MCPTT user with M MCPTT groups of the N MCPTT groups, where $1 \leq M \leq N$, and M is an integer; and sending, by the first communications device, a second association response to the third communications device, so that the third communications device associates the MCPTT user with the M MCPTT groups according to the second association response and sends a first association response to the second communications device, where the first association response is used to indicate that the MCPTT user is successfully associated with the M MCPTT groups.

In a first possible implementation manner of the second aspect, the second association response includes the identifier of the MCPTT user and identifiers of the M MCPTT groups.

With reference to the second aspect or the first possible implementation manner of the second aspect, in a second possible implementation manner of the second aspect, the second communications device is UE, the first communications device is a network device configured for deployment of a group database, and the third communications device is an MCPTT server configured to manage the MCPTT user or is an MCPTT server configured to manage the N MCPTT groups; or the second communications device is UE, the first communications device is an MCPTT server configured to manage the N MCPTT groups, and the third communications device is an MCPTT server configured to manage the MCPTT user; or the second communications device is an MCPTT server configured to manage the MCPTT user, the first communications device is a network device configured for deployment of a group database, and the third communications device is an MCPTT server configured to manage the N MCPTT groups or is the MCPTT server configured to manage the MCPTT user.

With reference to the second aspect or the first possible implementation manner or the second possible implementation manner of the second aspect, in a third possible implementation manner of the second aspect, before the determining, by the first communications device according to association subscription information of the MCPTT user, to associate the MCPTT user with M MCPTT groups of the N MCPTT groups, the method further includes:

obtaining, by the first communications device, subscription data of the MCPTT user according to the identifier of the MCPTT user; and obtaining the association subscription information of the MCPTT user according to the subscription data of the MCPTT user; or obtaining, by the first communications device, group information of the N MCPTT groups according to the identifiers of the N MCPTT groups; and obtaining the association subscription information of the MCPTT user according to the group information of the N MCPTT groups and the identifier of the MCPTT user.

With reference to the second aspect or any one of the first to the third possible implementation manners of the second aspect, in a fourth possible implementation manner of the second aspect, before the determining, by the first communications device according to association subscription information of the MCPTT user, to associate the MCPTT user with M MCPTT groups of the N MCPTT groups, the method further includes:

determining, by the first communications device according to the M MCPTT groups and the identifier of the MCPTT user, that the MCPTT user is an authorized MCPTT group user of the M MCPTT groups.

According to a third aspect, an embodiment of the present invention provides a method for associating a user with a group, including:

sending, by a second communications device, a first association request to a first communications device, where the first association request includes an identifier of an MCPTT user and identifiers of N MCPTT groups, the first association request is used to request to associate the MCPTT user with the N MCPTT groups, and N is an integer greater than or equal to 1; and receiving, by the second communications device, a first association response sent by the first communications device, where the first association response is used to indicate that the MCPTT user is successfully associated with M MCPTT groups of the N MCPTT groups, 1≤M≤N, and M is an integer.

In a first possible implementation manner of the third aspect, the first communications device is a network device configured for deployment of a group database; or, the first communications device is a first MCPTT server, and the first MCPTT server is an MCPTT server of the MCPTT user or is an MCPTT server that manages the N MCPTT groups; and the second communications device is UE.

With reference to the first possible implementation manner of the third aspect, in a second possible implementation manner of the third aspect, when the first communications device is the MCPTT server configured to manage the N MCPTT groups or is the network device configured for deployment of a group database, the sending, by a second communications device, a first association request to a first communications device includes:

sending, by the second communications device, the first association request to the first communications device via the MCPTT server of the MCPTT user; and the receiving, by the second communications device, a first association response sent by the first communications device includes:

receiving, by the second communications device via the MCPTT server of the MCPTT user, the first association response sent by the first communications device.

In a third possible implementation manner of the third aspect, the first communications device is an MCPTT server configured to manage the N MCPTT groups, and the second communications device is an MCPTT server configured to manage the MCPTT user.

With reference to the third possible implementation manner of the third aspect, in a fourth possible implementation manner of the third aspect, before the sending, by a second communications device, a first association request to a first communications device, the method further includes:

receiving, by the second communications device, a third association request sent by UE, where the third association request includes the identifier of the MCPTT user and identifiers of H MCPTT groups, the third association request is used to request to associate the MCPTT user with the H MCPTT groups, H is an integer greater than or equal to 1, and the H MCPTT groups include the N MCPTT groups; and determining, by the second communications device according to the third association request and MCPTT groups managed by T third MCPTT servers, the MCPTT groups managed by the T third MCPTT servers of the H MCPTT groups, where the MCPTT groups managed by the T third MCPTT servers include the H MCPTT groups, each third MCPTT server manages at least one MCPTT group of the H MCPTT groups, and the first communications device is any MCPTT server of the T third MCPTT servers; and after the receiving, by the second communications device, a first association response sent by the first communications device, the method further includes:

sending, by the second communications device, a third association response to the UE according to the first association response, where the third association response is used to indicate that the MCPTT user is successfully associated with L MCPTT groups of the H MCPTT groups, M≤L≤H, and L is an integer.

According to a fourth aspect, an embodiment of the present invention provides a communications device, used as a first communications device, and including:

a receiving unit, configured to receive a first association request sent by a second communications device, where the first association request includes an identifier of an MCPTT user and identifiers of N MCPTT groups, the first association request is used to request to associate the MCPTT user with the N MCPTT groups, and N is an integer greater than or equal to 1;

a processing unit, configured to associate the MCPTT user with M MCPTT groups of the N MCPTT groups according to association subscription information of the MCPTT user, where the association subscription information of the MCPTT user is used to indicate an MCPTT group that the MCPTT user can be associated with; and a sending unit, configured to send a first association response to the second communications device, where the first association response is used to indicate that the MCPTT user is successfully associated with the M MCPTT groups of the N MCPTT groups, 1≤M≤N, and M is an integer.

In a first possible implementation manner of the fourth aspect, the first communications device is a network device configured for deployment of a group database; or, the first communications device is a first MCPTT server, and the first MCPTT server is an MCPTT server configured to manage the MCPTT user or is an MCPTT server configured to manage the N MCPTT groups; and the second communications device is UE.

In a second possible implementation manner of the fourth aspect, the first communications device is an MCPTT server configured to manage the N MCPTT groups, and the second communications device is an MCPTT server configured to manage the MCPTT user.

With reference to the first possible implementation manner of the fourth aspect, in a third possible implementation manner of the fourth aspect, when the first communications device is the MCPTT server configured to manage the N MCPTT groups, the processing unit is specifically configured to:

determine, according to the association subscription information of the MCPTT user, to associate the MCPTT user with R MCPTT groups of the N MCPTT groups, where $1 \leq R \leq N$, and R is an integer;

send a second association request to the MCPTT server configured to manage the MCPTT user, where the second association request includes the identifier of the MCPTT user and identifiers of the R MCPTT groups, so that the MCPTT server configured to manage the MCPTT user determines, according to the second association request and the association subscription information of the MCPTT user, to associate the MCPTT user with the M MCPTT groups of the R MCPTT groups, where $1 \leq M \leq R$;

receive a second association response sent by the MCPTT server configured to manage the MCPTT user, where the second association response is used to instruct to associate the MCPTT user with the M MCPTT groups of the R MCPTT groups; and associate the MCPTT user with the M MCPTT groups according to the second association response.

With reference to the first possible implementation manner of the fourth aspect or the second possible implementation manner of the fourth aspect, in a fourth possible implementation manner of the fourth aspect, the processing unit is specifically configured to: determine, according to the association subscription information of the MCPTT user, to associate the MCPTT user with the M MCPTT groups of the N MCPTT groups; associate the MCPTT user with the M MCPTT groups.

With reference to any one of the fourth aspect or any one of the first to the fourth possible implementation manners of the fourth aspect, in a fifth possible implementation manner of the fourth aspect, when the processing unit associates the MCPTT user with the M MCPTT groups of the N MCPTT groups, the processing unit is specifically configured to generate first association information, where the first association information is used to indicate an association relationship between the MCPTT user and the M MCPTT groups.

With reference to the fifth possible implementation manner of the fourth aspect, in a sixth possible implementation manner of the fourth aspect, after the processing unit generates the first association information, the processing unit is further configured to save the first association information.

With reference to the fifth possible implementation manner of the fourth aspect or the sixth possible implementation manner of the fourth aspect, in a seventh possible implementation manner of the fourth aspect, when the first communications device is the MCPTT server configured to manage the MCPTT user or is the MCPTT server configured to manage the N MCPTT groups, the sending unit is further configured to: after the processing unit generates the first association information, send the first association information to the network device configured for deployment of a group database, so that the network device configured for deployment of a group database saves the first association information; or when the first communications device is the MCPTT server configured to manage the MCPTT user or is the network device configured for deployment of a group database, the sending unit is further configured to: after the processing unit generates the first association information, respectively send second association information to K second MCPTT servers according to the first association information, so that each second MCPTT server saves the received second association information, where $1 \leq K \leq M$, K is an integer, MCPTT groups managed by the K second MCPTT servers include the M MCPTT groups, each second MCPTT server manages at least one MCPTT group of the M MCPTT groups, and each piece of second association information is used to indicate an association relationship between the MCPTT user and the at least one MCPTT group managed by the second MCPTT server that receives the second association information; or when the first communications device is the MCPTT server configured to manage the N MCPTT groups or is the network device configured for deployment of a group database, the sending unit is further configured to: after the processing unit generates the first association information, send the first association information to the MCPTT server configured to manage the MCPTT user, so that the MCPTT server configured to manage the MCPTT user saves the first association information.

With reference to the fourth aspect or any one of the first to the seventh possible implementation manners of the fourth aspect, in an eighth possible implementation manner of the fourth aspect, the processing unit is further configured to: before the processing unit associates the MCPTT user with the M MCPTT groups of the N MCPTT groups according to the association subscription information of the MCPTT user, obtain subscription data of the MCPTT user according to the identifier of the MCPTT user; and obtain the association subscription information of the MCPTT user according to the subscription data of the MCPTT user; or obtain group information of the N MCPTT groups according to the identifiers of the N MCPTT groups; and obtain the association subscription information of the MCPTT user according to the group information of the N MCPTT groups and the identifier of the MCPTT user.

With reference to the fourth aspect or any one of the first to the eighth possible implementation manners of the fourth aspect, in a ninth possible implementation manner of the fourth aspect, the processing unit is further configured to: before the processing unit associates the MCPTT user with the M MCPTT groups of the N MCPTT groups according to the association subscription information of the MCPTT user, determine, according to the group information of the M MCPTT groups and the identifier of the MCPTT user, that the MCPTT user is an authorized MCPTT group user of the M MCPTT groups.

According to a fifth aspect, an embodiment of the present invention provides a communications device, used as a first communications device, and including:

a receiving unit, configured to receive, via a third communications device, a first association request sent by a second communications device, where the first association request includes an identifier of an MCPTT user and identifiers of N MCPTT groups, the first association request is used to request to associate the MCPTT user with the N MCPTT groups, and N is an integer greater than or equal to 1;

a processing unit, configured to determine, according to association subscription information of the MCPTT user, to associate the MCPTT user with M MCPTT groups of the N MCPTT groups, where 1≤M≤N, and M is an integer; and a sending unit, configured to send a second association response to the third communications device, so that the third communications device associates the MCPTT user with the M MCPTT groups according to the second association response and sends a first association response to the second communications device, where the first association response is used to indicate that the MCPTT user is successfully associated with the M MCPTT groups.

In a first possible implementation manner of the fifth aspect, the second association response includes the identifier of the MCPTT user and identifiers of the M MCPTT groups.

With reference to the fifth aspect or the first possible implementation manner of the fifth aspect, in a second possible implementation manner of the fifth aspect, the second communications device is UE, the first communications device is a network device configured for deployment of a group database, and the third communications device is an MCPTT server configured to manage the MCPTT user or is an MCPTT server configured to manage the N MCPTT groups; or the second communications device is UE, the first communications device is an MCPTT server configured to manage the N MCPTT groups, and the third communications device is an MCPTT server configured to manage the MCPTT user; or the second communications device is an MCPTT server configured to manage the MCPTT user, the first communications device is a network device configured for deployment of a group database, and the third communications device is an MCPTT server configured to manage the N MCPTT groups or is the MCPTT server configured to manage the MCPTT user.

With reference to the fifth aspect or the first possible implementation manner or the second possible implementation manner of the fifth aspect, in a third possible implementation manner of the fifth aspect, the processing unit is further configured to: before the processing unit determines, according to the association subscription information of the MCPTT user, to associate the MCPTT user with the M MCPTT groups of the N MCPTT groups, obtain subscription data of the MCPTT user according to the identifier of the MCPTT user; and obtain the association subscription information of the MCPTT user according to the subscription data of the MCPTT user; or obtain group information of the N MCPTT groups according to the identifiers of the N MCPTT groups; and obtain the association subscription information of the MCPTT user according to the group information of the N MCPTT groups and the identifier of the MCPTT user.

With reference to the fifth aspect or any one of the first to the third possible implementation manners of the fifth aspect, in a fourth possible implementation manner of the fifth aspect, the processing unit is further configured to: before the processing unit determines, according to the association subscription information of the MCPTT user, to associate the MCPTT user with the M MCPTT groups of the N MCPTT groups, determine, according to the M MCPTT groups and the identifier of the MCPTT user, that the MCPTT user is an authorized MCPTT group user of the M MCPTT groups.

According to a sixth aspect, an embodiment of the present invention provides a communications device, used as a second communications device, and including:

a sending unit, configured to send a first association request to a first communications device, where the first association request includes an identifier of an MCPTT user and identifiers of N MCPTT groups, the first association request is used to request to associate the MCPTT user with the N MCPTT groups, and N is an integer greater than or equal to 1; and a receiving unit, configured to receive a first association response sent by the first communications device, where the first association response is used to indicate that the MCPTT user is successfully associated with M MCPTT groups of the N MCPTT groups, 1≤M≤N, and M is an integer.

In a first possible implementation manner of the sixth aspect, the first communications device is a network device configured for deployment of a group database; or, the first communications device is a first MCPTT server, and the first MCPTT server is an MCPTT server of the MCPTT user or is an MCPTT server that manages the N MCPTT groups; and the second communications device is UE.

With reference to the first possible implementation manner of the sixth aspect, in a second possible implementation manner of the sixth aspect, when the first communications device is the MCPTT server configured to manage the N MCPTT groups or is the network device configured for deployment of a group database, the sending unit is specifically configured to send the first association request to the first communications device via the MCPTT server of the MCPTT user; and the receiving unit is specifically configured to receive, via the MCPTT server of the MCPTT user, the first association response sent by the first communications device.

In a third possible implementation manner of the sixth aspect, the first communications device is an MCPTT server configured to manage the N MCPTT groups, and the second communications device is an MCPTT server configured to manage the MCPTT user.

With reference to the third possible implementation manner of the sixth aspect, in a fourth possible implementation manner of the sixth aspect, the communications device further includes: a processing unit, where the receiving unit is further configured to: before the sending unit sends the first association request to the first communications device, receive a third association request sent by UE, where the third association request includes the identifier of the MCPTT user and identifiers of H MCPTT groups, the third association request is used to request to associate the MCPTT user with the H MCPTT groups, H is an integer greater than or equal to 1, and the H MCPTT groups include the N MCPTT groups;

the processing unit is configured to determine, according to the third association request and MCPTT groups managed by T third MCPTT servers, the MCPTT groups managed by the T third MCPTT servers of the H MCPTT groups, where the MCPTT groups managed by the T third MCPTT servers include the H MCPTT groups, each third MCPTT server manages at least one MCPTT group of the H MCPTT groups, and the first communications device is any MCPTT server of the T third MCPTT servers; and the sending unit is further configured to: after the receiving unit receives the first association response sent by the first communications device, send a third association response to the UE according to the first association response, where the third association response is used to indicate that the MCPTT user is successfully associated with L MCPTT groups of the H MCPTT groups, M≤L≤H, and L is an integer.

According to the method and the device for associating a user with a group provided in the embodiments of the present invention, a first communications device receives a first association request sent by a second communications device, where the first association request includes an identifier of an MCPTT user and identifiers of N MCPTT groups; and the first communications device associates the MCPTT user with M MCPTT groups of the N MCPTT groups according to association subscription information of the MCPTT user, and then sends a first association response to the second communications device, where the first association response is used to indicate that the MCPTT user is successfully associated with the M MCPTT groups. In this way, the MCPTT user is associated with the M MCPTT groups that the MCPTT user is interested in.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
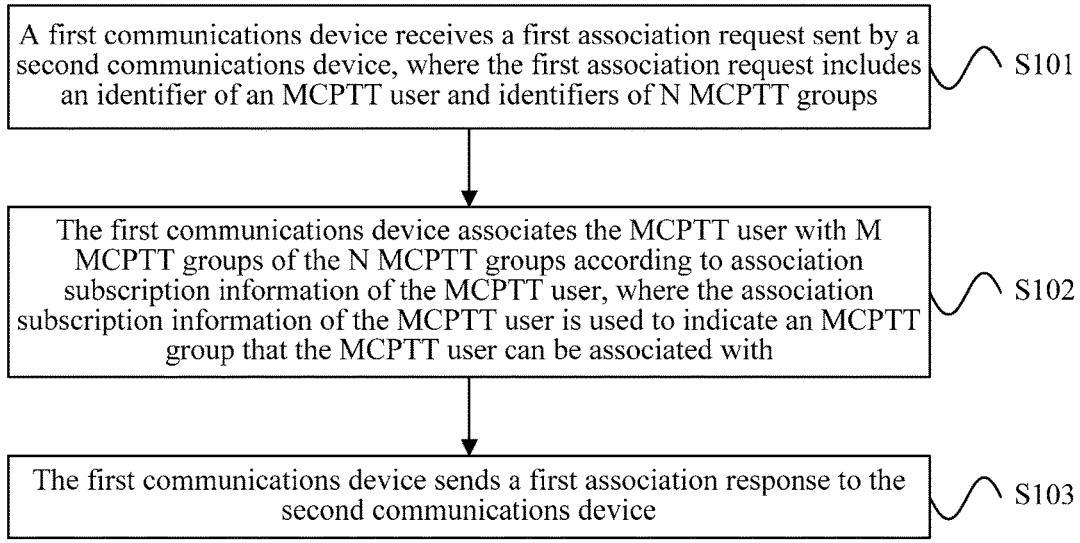
FIG. 1 is a flowchart of Embodiment 1 of a method for associating a user with a group according to the present invention.

FIG. 1 is a flowchart of Embodiment 1 of a method for associating a user with a group according to the present invention. As shown in FIG. 1, the method in this embodiment may include:

S101: A first communications device receives a first association request sent by a second communications device, where the first association request includes an identifier of an MCPTT user and identifiers of N MCPTT groups.

In this embodiment, the first association request is used to request to associate the MCPTT user with the N MCPTT groups, and N is an integer greater than or equal to 1.

S102: The first communications device associates the MCPTT user with M MCPTT groups of the N MCPTT groups according to association subscription information of the MCPTT user, where the association subscription information of the MCPTT user is used to indicate an MCPTT group that the MCPTT user can be associated with.

S103: The first communications device sends a first association response to the second communications device.

In this embodiment, the first communications device may obtain the association subscription information of the MCPTT user according to the identifier of the MCPTT user, where the association subscription information of the MCPTT user is used to indicate an MCPTT group that the MCPTT user can be associated with.

In an optional implementation manner of this embodiment, the first communications device determines, according to the association subscription information of the MCPTT user, to associate the MCPTT user with the M MCPTT groups of the N MCPTT groups. The association subscription information of the MCPTT user in this embodiment may indicate which MCPTT groups are MCPTT groups that the MCPTT user can be associated with. For example, the association subscription information of the MCPTT user includes an identifier of an MCPTT group that the MCPTT user can be associated with; and/or, the association subscription information of the MCPTT user may indicate which MCPTT groups are MCPTT groups that the MCPTT user cannot be associated with, that is, indicate that an MCPTT group other than these MCPTT groups is an MCPTT group that the MCPTT user can be associated with, for example, the association subscription information of the MCPTT user includes an identifier of an MCPTT group that the MCPTT user cannot be associated with. The MCPTT user can be successfully associated with these MCPTT groups only when the association subscription information of the MCPTT user indicates MCPTT groups of the N MCPTT groups that the MCPTT user can be associated with. Therefore, although the MCPTT user requests to be associated with the N MCPTT groups, the MCPTT user can be associated with only an MCPTT group that is indicated by the association subscription information and that the MCPTT user can be associated with. When the association subscription information indicates that association is forbidden or the association subscription information does not include association subscription information indicating that the MCPTT user is related to some of the MCPTT groups in the first association request, the MCPTT user cannot be associated with these MCPTT groups. As can be seen, the association subscription information of the MCPTT user indicates that the MCPTT user can be associated with the M MCPTT groups of the N MCPTT groups, and the first communications device may determine to associate the MCPTT user with the M MCPTT groups, then associate the MCPTT user with the M MCPTT groups, and then send the first association response to the second communications device, where the first association response is used to indicate that the MCPTT user is successfully associated with the M MCPTT groups, and M is an integer greater than or equal to 1 and less than or equal to N. Correspondingly, after the second communications device receives the first association response, the second communications device may learn that the MCPTT user has been associated with the M MCPTT groups. Optionally, the first association response includes the identifier of the MCPTT user and identifiers of the M MCPTT groups.

Optionally, a feasible implementation manner of associating, by the first communications device, the MCPTT user with the M MCPTT groups is: generating, by the first communications device, first association information, where the first association information is used to indicate an association relationship between the MCPTT user and the M MCPTT groups.

It should be noted that, if the association subscription information of the MCPTT user indicates that the MCPTT user can be associated with zero MCPTT group of the N MCPTT groups, that is, indicates that the MCPTT user cannot be associated with any MCPTT group of the N MCPTT groups, the first communications device sends, to the second communications device, an association response used to indicate that the MCPTT user has failed to be associated with the N MCPTT groups.

It should be noted that, an association between the MCPTT user and an MCPTT group indicates that: the MCPTT user marks interest in the MCPTT group, and in comparison with another user that is not associated with the MCPTT group, the MCPTT user can receive a push message sent by the MCPTT group, and may delay joining a call of an associated group.

Optionally, the second communications device may be UE, and the first communications device may be a first MCPTT server, and the first MCPTT server is an MCPTT server configured to manage the MCPTT user or is an MCPTT server configured to manage the N MCPTT groups; or, the first communications device is a network device configured for deployment of a group database.

Optionally, the second communications device is an MCPTT server configured to manage the MCPTT user, and the first communications device is an MCPTT server configured to manage the N MCPTT groups.

In this embodiment, a first communications device receives a first association request sent by a second communications device, where the first association request includes an identifier of an MCPTT user and identifiers of N MCPTT groups; and the first communications device associates the MCPTT user with M MCPTT groups of the N MCPTT groups according to association subscription information of the MCPTT user, and then sends a first association response to the second communications device, where the first association response is used to indicate that the MCPTT user is successfully associated with the M MCPTT groups. In this way, the MCPTT user is associated with the M MCPTT groups that the MCPTT user is interested in.

Figure 2:
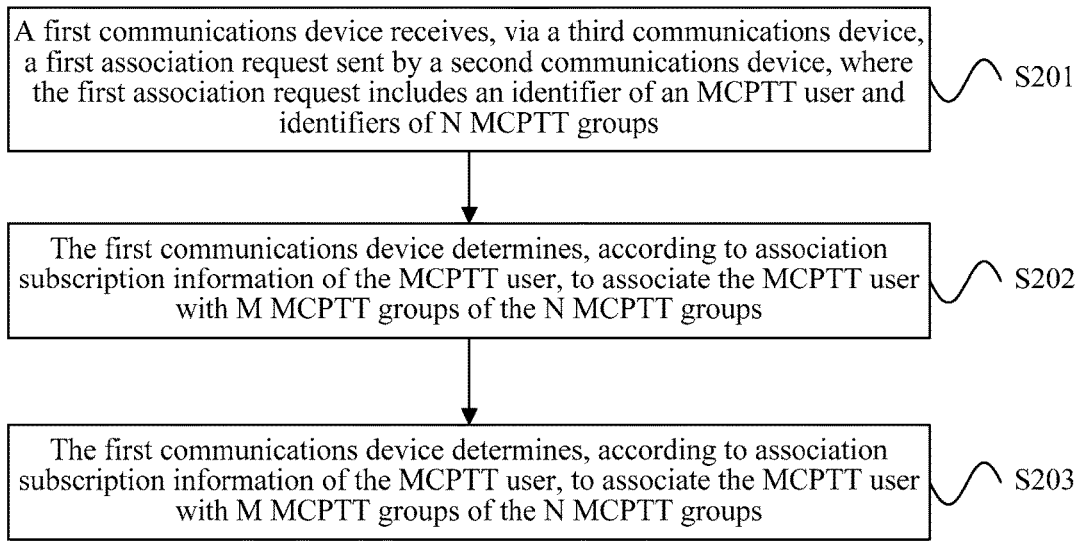
FIG. 2 is a flowchart of Embodiment 2 of a method for associating a user with a group according to the present invention.

FIG. 2 is a flowchart of Embodiment 2 of a method for associating a user with a group according to the present invention. As shown in FIG. 2, the method in this embodiment may include:

S201: A first communications device receives, via a third communications device, a first association request sent by a second communications device, where the first association request includes an identifier of an MCPTT user and identifiers of N MCPTT groups.

In this embodiment, the second communications device sends the first association request to the third communications device, and the third communications device sends the received first association request to the first communications device. The first association request is used to request to associate the MCPTT user with the N MCPTT groups, and N is an integer greater than or equal to 1.

S202: The first communications device determines, according to association subscription information of the MCPTT user, to associate the MCPTT user with M MCPTT groups of the N MCPTT groups.

In this embodiment, the first communications device may obtain the association subscription information of the MCPTT user according to the identifier of the MCPTT user, where the association subscription information of the MCPTT user is used to indicate an MCPTT group that the MCPTT user can be associated with. The first communications device may learn, according to the association subscription information of the MCPTT user, that the MCPTT user can be associated with the M MCPTT groups of the N MCPTT groups, and may therefore determine to associate the MCPTT user with the M MCPTT groups of the N MCPTT groups, where $1 \leq M \leq N$, and M is an integer.

S203: The first communications device sends a second association response to the third communications device, so that the third communications device associates the MCPTT user with the M MCPTT groups according to the second association response and sends a first association response to the second communications device.

In this embodiment, after the first communications device determines to associate the MCPTT user with the M MCPTT groups of the N MCPTT groups, the first communications device send the second association response to the third communications device. After receiving the second association response, the third communications device associates the MCPTT user with the M MCPTT groups according to the second association response, and sends the first association response to the second communications device, where the first association response is used to indicate that the MCPTT user is successfully associated with the M MCPTT groups. Correspondingly, after receiving the first association response, the second communications device may learn that the MCPTT user has been associated with the MCPTT group. Optionally, the first association response is the same as the second association response. Optionally, the second association response includes the identifier of the MCPTT user and identifiers of the M MCPTT groups.

Optionally, a feasible implementation manner of associating, by the third communications device, the MCPTT user with the M MCPTT groups is: generating, by the third communications device, first association information according to the second association response, where the first association information is used to indicate an association relationship between the MCPTT user and the M MCPTT groups.

Optionally, the second communications device is UE, and when the first communications device is a network device configured for deployment of a group database, the third communications device is an MCPTT server configured to manage the MCPTT user or is an MCPTT server configured to manage the N MCPTT groups; or, when the first communications device is the MCPTT server configured to manage the N MCPTT groups, the third communications device is an MCPTT server of the MCPTT user.

Optionally, the second communications device is an MCPTT server configured to manage the MCPTT user, the first communications device is a network device configured for deployment of a group database, and the third communications device is an MCPTT server configured to manage the N MCPTT groups or is the MCPTT server configured to manage the MCPTT user.

Specifically, based on the embodiment shown in FIG. 2, when the second communications device and the third communications device are a same device, that is, the MCPTT server configured to manage the MCPTT user, specifically, the following implementation manner is used: receiving, by the first communications device, the first association request sent by the second communications device; determining, by the first communications device according to the association subscription information of the MCPTT user, to associate the MCPTT user with the M MCPTT groups of the N MCPTT groups; and sending, by the first communications device, the second association response to the second communications device, so that the second communications device associates the MCPTT user with the M MCPTT groups according to the second association response and generates the first association response.

For related terms such as the first association request and the first association response, reference may all be made to the descriptions of the embodiment shown in FIG. 2, and details are not described again.

According to the method for associating a user with a group provided in this embodiment, a first communications device receives, via a third communications device, a first association request sent by a second communications device, where the first association request includes an identifier of an MCPTT user and identifiers of N MCPTT groups, determines, according to association subscription information of the MCPTT user, to associate the MCPTT user with M MCPTT groups of the N MCPTT groups, and then sends a second association response to the third communications device, so that the third communications device associates the MCPTT user with the M MCPTT groups according to the second association response and sends a first association response to the second communications device, where the first association response is used to indicate that the MCPTT user is successfully associated with the M MCPTT groups. In this way, the MCPTT user is associated with the M MCPTT groups that the MCPTT user is interested in.

Figure 3:
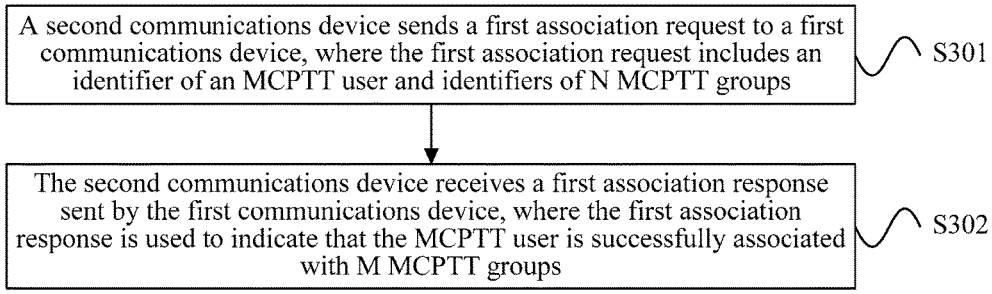
FIG. 3 is a flowchart of Embodiment 3 of a method for associating a user with a group according to the present invention.

FIG. 3 is a flowchart of Embodiment 3 of a method for associating a user with a group according to the present invention. As shown in FIG. 3, the method in this embodiment may include:

S301: A second communications device sends a first association request to a first communications device, where the first association request includes an identifier of an MCPTT user and identifiers of N MCPTT groups.

S302: The second communications device receives a first association response sent by the first communications device, where the first association response is used to indicate that the MCPTT user is successfully associated with M MCPTT groups.

In this embodiment, the second communications device may send the first association request to the first communications device, where the first association request includes the identifier of the MCPTT user and the identifiers of the N MCPTT groups, the first association request is used to request to associate the MCPTT user with the N MCPTT groups, and N is an integer greater than or equal to 1; then, the second communications device receives the first association response sent by the first communications device, where the first association response is used to indicate that the MCPTT user is successfully associated with the M MCPTT groups of the N MCPTT groups, $1 \le M \le N$, and M is an integer. The second communications device learns, according to the first association response, that the MCPTT user has been associated with the M MCPTT groups.

Optionally, the first communications device is a network device configured for deployment of a group database; or, the first communications device is a first MCPTT server, and the first MCPTT server is an MCPTT server of the MCPTT user or is an MCPTT server that manages the N MCPTT groups; and the second communications device is UE.

Optionally, the first communications device is an MCPTT server configured to manage the N MCPTT groups, and the second communications device is an MCPTT server configured to manage the MCPTT user.

In this embodiment, a second communications device sends a first association request to a first communications device, where the first association request includes an identifier of an MCPTT user and identifiers of N MCPTT groups, and then receives a first association response sent by the first communications device, where the first association response is used to indicate that the MCPTT user is successfully associated with M MCPTT groups. In this way, the MCPTT user is associated with the M MCPTT groups that the MCPTT user is interested in.

Figure 4:
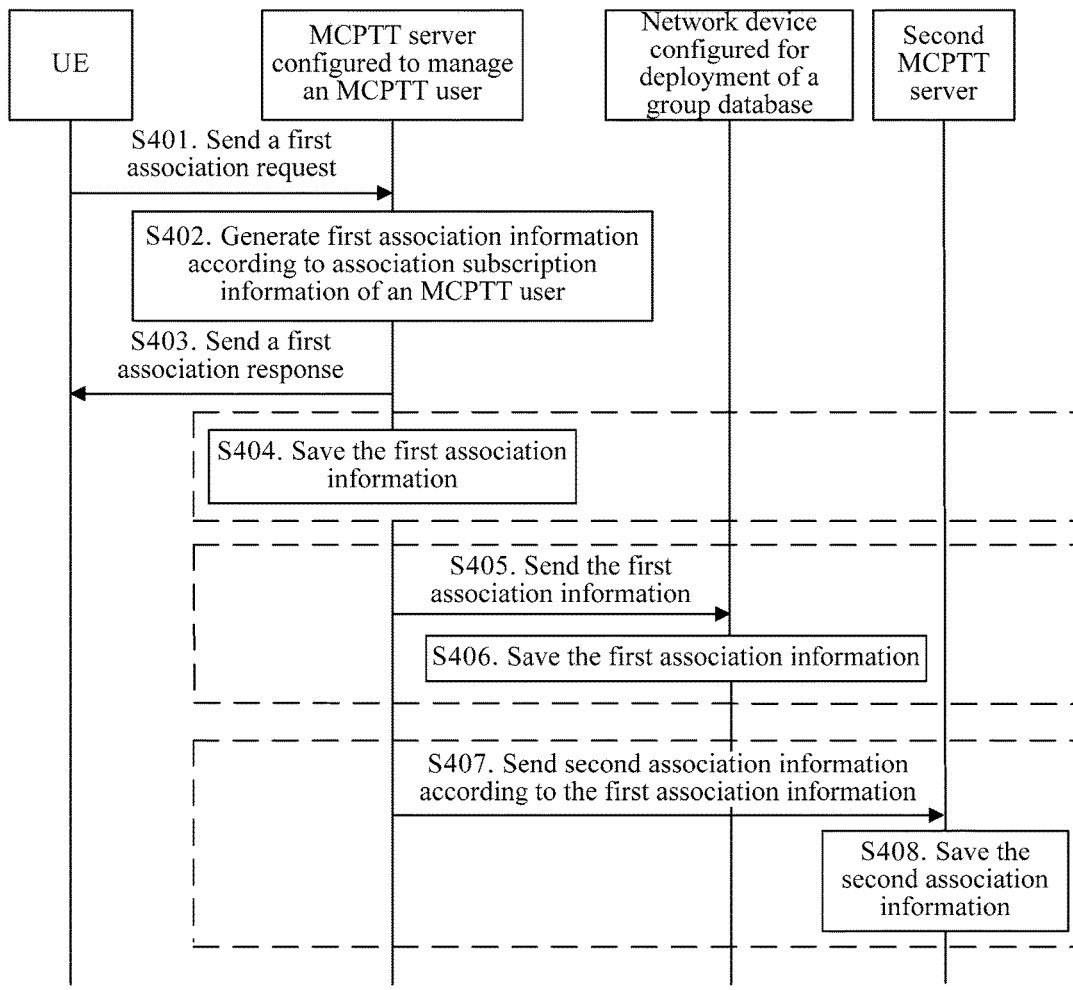
FIG. 4 is a flowchart of Embodiment 4 of a method for associating a user with a group according to the present invention.

FIG. 4 is a flowchart of Embodiment 4 of a method for associating a user with a group according to the present invention. As shown in FIG. 4, this embodiment is based on Embodiment 1 and Embodiment 3 of the method of the present invention. A first communications device is a first MCPTT server, and the first MCPTT server is an MCPTT server configured to manage an MCPTT user; and a second communications device is UE. In this embodiment, the MCPTT server configured to manage the MCPTT user performs authorization check on a received first association request, that is, determines, according to association subscription information of the MCPTT user, which MCPTT groups in the association request the MCPTT user can be associated with. The method in this embodiment may include:

S401: The UE sends a first association request to the MCPTT server configured to manage the MCPTT user.

In this embodiment, when the MCPTT user initiates association with N MCPTT groups, the UE used by the MCPTT user generates the first association request, and sends the first association request to the MCPTT server configured to manage the MCPTT user, where the first association request includes an identifier of the MCPTT user and identifiers of the N MCPTT groups, the first association request is used to request to associate the MCPTT user with the N MCPTT groups, and N is an integer greater than or equal to 1.

S402: The MCPTT server configured to manage the MCPTT user generates first association information according to the association subscription information of the MCPTT user.

In this embodiment, after the MCPTT server configured to manage the MCPTT user receives the first association request sent by the UE, the MCPTT server configured to manage the MCPTT user may obtain the association subscription information of the MCPTT user, where the association subscription information of the MCPTT user is used to indicate an MCPTT group that the MCPTT user can be associated with, determine, according to the association subscription information of the MCPTT user, to associate the MCPTT user with M MCPTT groups of the N MCPTT groups, and then, generate the first association information, where the first association information is used to indicate an association relationship between the MCPTT user and the M MCPTT groups, and M is an integer greater than or equal to 1 and less than or equal to N.

Optionally, before the MCPTT server configured to manage the MCPTT user generates the first association information according to the association subscription information of the MCPTT user, the MCPTT server configured to manage the MCPTT user may obtain subscription data of the MCPTT user according to the identifier of the MCPTT user, and then, obtain the association subscription information of the MCPTT user according to the subscription data of the MCPTT user. The subscription data of the MCPTT user may indicate an MCPTT group that the MCPTT user can be associated with, and/or, an MCPTT group that the MCPTT user cannot be associated with. Therefore, the MCPTT server configured to manage the MCPTT user uses information, indicating an MCPTT group that the MCPTT user can be associated with and/or an MCPTT group that the MCPTT user cannot be associated with, in the subscription data of the MCPTT user, as the association subscription information of the MCPTT user. Optionally, an MCPTT server of the MCPTT user may obtain the subscription data of the MCPTT user from a network device configured for deployment of a group database.

Optionally, before the MCPTT server configured to manage the MCPTT user generates the first association information according to the association subscription information of the MCPTT user, the MCPTT server configured to manage the MCPTT user obtains group information of the N MCPTT groups according to the identifiers of the N MCPTT groups, and then, obtains the association subscription information of the MCPTT user according to the group information of the N MCPTT groups and the identifier of the MCPTT user. Group information of each MCPTT group may indicate an MCPTT user that can be associated with the MCPTT group, and/or, an MCPTT user that cannot be associated with the MCPTT group. Therefore, information used to indicate an MCPTT group that the MCPTT user can be associated with, and/or, an MCPTT group that the MCPTT user cannot be associated with may be obtained according to the group information of the N MCPTT groups and the identifier of the MCPTT user, and the information is used as the association subscription information of the MCPTT user. Optionally, the MCPTT server configured to manage the MCPTT user may obtain the group information of the N MCPTT groups from a network device configured for deployment of a group database or an MCPTT server configured to manage an MCPTT group.

S403: The MCPTT server configured to manage the MCPTT user sends a first association response to the UE.

In this embodiment, after generating the first association information, the MCPTT server configured to manage the MCPTT user sends the first association response to the UE, where the first association response is used to indicate that the MCPTT user is successfully associated with the M MCPTT groups. Optionally, the first association response is further used to indicate that the MCPTT user has failed to be associated with an MCPTT group of the N MCPTT groups other than the MCPTT groups. Correspondingly, after receiving the first association response, the UE completes association between the MCPTT user and the M MCPTT groups.

Optionally, after S402 is performed, that is, after the MCPTT server configured to manage the MCPTT user generates the first association information, the first association information needs to be saved. This may be implemented by using the following optional implementation solutions.

In a first optional implementation solution, after S402 is performed, S404 is performed.

S404: The MCPTT server configured to manage the MCPTT user saves the first association information.

In this embodiment, if an association relationship between the MCPTT user and an MCPTT group needs to be saved in the MCPTT server configured to manage the MCPTT user, after generating the first association information, the MCPTT server configured to manage the MCPTT user saves the first association information.

In a second optional implementation solution, after S402 is performed, S405 and S406 are performed.

S405: The MCPTT server configured to manage the MCPTT user sends the first association information to a network device configured for deployment of a group database.

S406: The network device configured for deployment of a group database saves the first association information.

In this embodiment, if an association relationship between the MCPTT user and an MCPTT group needs to be saved in the network device configured for deployment of a group database, after generating the first association information, the MCPTT server configured to manage the MCPTT user sends the first association information to the network device configured for deployment of a group database; and the network device configured for deployment of a group database receives the first association information and saves the first association information. For example, the network device configured for deployment of a group database may store group information of each MCPTT group, and the network device configured for deployment of a group database updates group information of the M MCPTT groups according to the first association information.

In a third optional implementation solution, after S402 is performed, S407 and S408 are performed.

S407: The MCPTT server configured to manage the MCPTT user sends second association information to a second MCPTT server according to the first association information.

S408: The second MCPTT server saves the second association information.

In this embodiment, the M MCPTT groups are managed by K second MCPTT servers. That is, each second MCPTT server manages at least one MCPTT group of the M MCPTT groups, and MCPTT groups managed by the K second MCPTT servers include the M MCPTT groups. If an association relationship between the MCPTT user and an MCPTT group is saved in an MCPTT server configured to manage an MCPTT group, the MCPTT server configured to manage the MCPTT user sends corresponding second association information to the K second MCPTT servers respectively according to the first association information, and each piece of second association information is used to indicate an association relationship between the MCPTT user and the at least one MCPTT group managed by the second MCPTT server that receives the second association information. Each second MCPTT server receives the corresponding second association information, and then saves the received second association information.

It should be noted that, only one MCPTT server of the K second MCPTT servers is shown in S409 and S408, and other second MCPTT servers are similar but not shown in FIG. 4.

It should be noted that, in an actual application, an association relationship between the MCPTT user and an MCPTT group may be stored in at least one of the following: the MCPTT server configured to manage the MCPTT user, the network device configured for deployment of a group database, or an MCPTT server configured to manage an MCPTT group; and correspondingly, at least one of the following: S404, S405 and S406, or S407 and S408 may be performed.

Optionally, before the MCPTT server configured to manage the MCPTT user performs S402, the MCPTT server configured to manage the MCPTT user determines, according to the group information of the M MCPTT groups and the identifier of the MCPTT user, that the MCPTT user is an authorized MCPTT group user of the M MCPTT groups. That is, validity check of a group user identity is performed by using the identifier of the MCPTT user and the group information of the N MCPTT groups. For example, if an MCPTT user is an authorized MCPTT group user of an MCPTT group, group information of the MCPTT group includes the MCPTT user. Therefore, it may be determined whether group information of each MCPTT group includes the identifier of the MCPTT user, so as to determine that the MCPTT user is an authorized MCPTT group user of which MCPTT groups of the N MCPTT groups. Optionally, before this, that the MCPTT server configured to manage the MCPTT user obtains the group information of the N MCPTT groups is further included.

In this embodiment, UE sends a first association request to an MCPTT server configured to manage an MCPTT user, and then, the MCPTT server configured to manage the MCPTT user generates first association information according to association subscription information of the MCPTT user, and sends a first association response to the UE, so as to notify that the MCPTT user is successfully associated with M MCPTT groups. In this way, the MCPTT user is associated with the M MCPTT groups that the MCPTT user is interested in.

Figure 5:
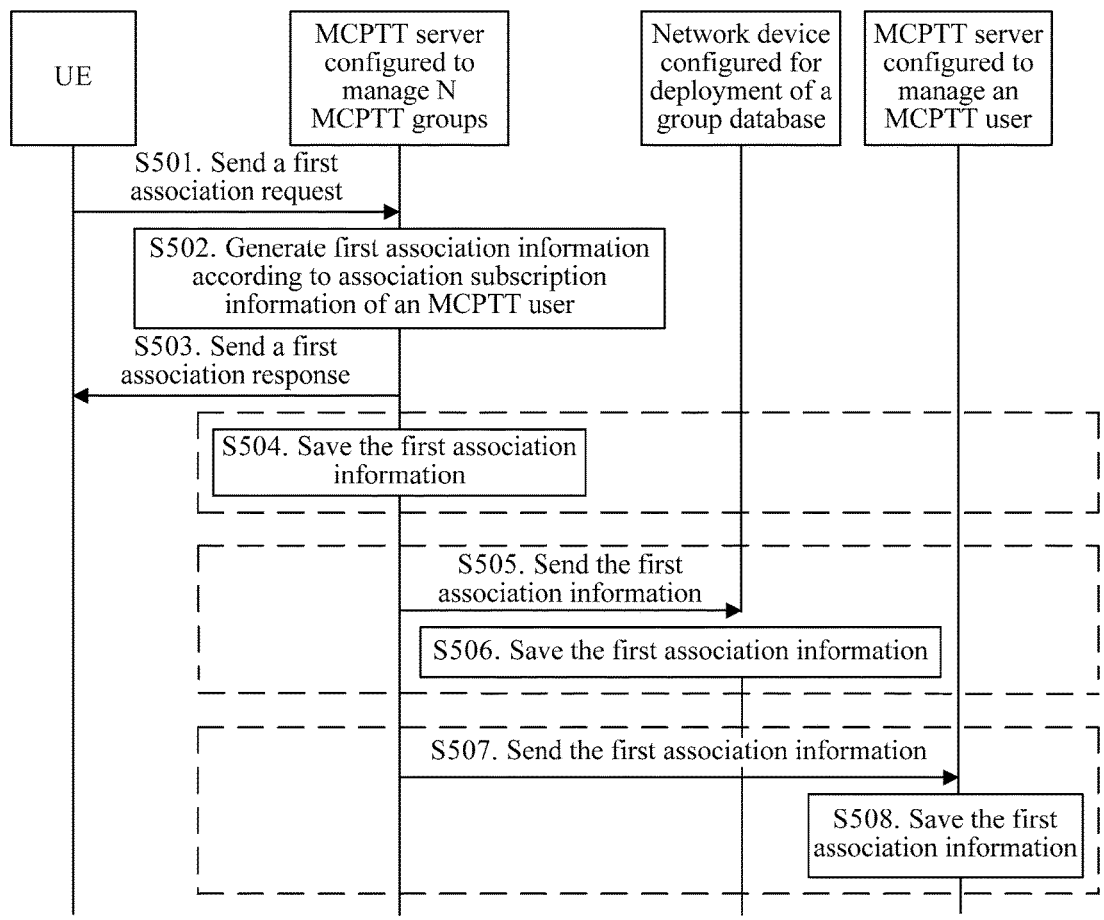
FIG. 5 is a flowchart of Embodiment 5 of a method for associating a user with a group according to the present invention.

FIG. 5 is a flowchart of Embodiment 5 of a method for associating a user with a group according to the present invention. As shown in FIG. 5, this embodiment is based on Embodiment 1 and Embodiment 3 of the method of the present invention. A first communications device is a first MCPTT server, and the first MCPTT server is an MCPTT server configured to manage N MCPTT groups; and a second communications device is UE. In this embodiment, an MCPTT server configured to manage an MCPTT group performs authorization check on a received first association request, that is, determines, according to association subscription information of an MCPTT user, which MCPTT groups in an association request the MCPTT user can be associated with. The method in this embodiment may include:

S501: The UE sends a first association request to the MCPTT server configured to manage the N MCPTT groups.

For a specific implementation process of S501 in this embodiment, reference may be made to related descriptions of Embodiment 4 of the method in the present invention, and details are not described herein again.

It should be noted that, when the MCPTT user initiates association with multiple MCPTT groups, and at least two MCPTT servers are configured to manage the multiple MCPTT groups, the UE sends an association request to each MCPTT server. Identifiers of the N MCPTT groups that are carried in the first association request in this embodiment are some of identifiers of all the multiple MCPTT groups that the MCPTT user initiates association with.

S502: The MCPTT server configured to manage the N MCPTT groups generates first association information according to the association subscription information of the MCPTT user.

S503: The MCPTT server configured to manage the N MCPTT groups sends a first association response to the UE.

For specific implementation processes of S502 and S503 in this embodiment, reference may be made to related descriptions of S402 and S403 in Embodiment 4 of the method in the present invention, and details are not described herein again.

Optionally, after S502 is performed, that is, after the MCPTT server configured to manage the N MCPTT groups generates the first association information, the first association information needs to be saved. This may be implemented by using the following optional implementation solutions.

In a first optional implementation solution, after S502 is performed, S504 is performed.

S504: The MCPTT server configured to manage the N MCPTT groups saves the first association information.

In this embodiment, if an association relationship between the MCPTT user and an MCPTT group needs to be saved in an MCPTT server configured to manage the MCPTT user, after generating the first association information, the MCPTT server configured to manage the N MCPTT groups saves the first association information.

In a second optional implementation solution, after S502 is performed, S505 and S506 are performed.

S505: The MCPTT server configured to manage the N MCPTT groups sends the first association information to a network device configured for deployment of a group database.

S506: The network device configured for deployment of a group database saves the first association information.

For specific implementation processes of S505 and S506 in this embodiment, reference may be made to related descriptions of S405 and S406 in Embodiment 4 of the method in the present invention, and details are not described herein again.

In a third optional implementation solution, after S502 is performed, S507 and S508 are performed.

S507: The MCPTT server configured to manage the N MCPTT groups sends the first association information to the MCPTT server configured to manage the MCPTT user.

S508: The MCPTT server configured to manage the MCPTT user saves the first association information.

In this embodiment, if an association relationship between the MCPTT user and an MCPTT group needs to be saved in the MCPTT server configured to manage the MCPTT user, after generating the first association information, the MCPTT server configured to manage the N MCPTT groups sends the first association information to the MCPTT server configured to manage the MCPTT user, and the MCPTT server configured to manage the MCPTT user receives the first association information and saves the first association information.

It should be noted that, in an actual application, an association relationship between the MCPTT user and an MCPTT group may be stored in at least one of the following: the MCPTT server configured to manage the MCPTT user, the network device configured for deployment of a group database, or an MCPTT server configured to manage an MCPTT group; and correspondingly, at least one of the following: S504, S505 and S506, or S507 and S508 may be performed.

Optionally, before the MCPTT server configured to manage the N MCPTT groups performs S502, the MCPTT server configured to manage the N MCPTT groups determines, according to group information of M MCPTT groups and an identifier of the MCPTT user, that the MCPTT user is an authorized MCPTT group user of the M MCPTT groups.

In this embodiment, UE sends a first association request to an MCPTT server configured to manage N MCPTT groups, and then, the MCPTT server configured to manage the N MCPTT groups generates first association information according to association subscription information of an MCPTT user, and sends a first association response to the UE, to notify that the MCPTT user is successfully associated with M MCPTT groups. In this way, the MCPTT user is associated with the M MCPTT groups that the MCPTT user is interested in.

Figure 6:
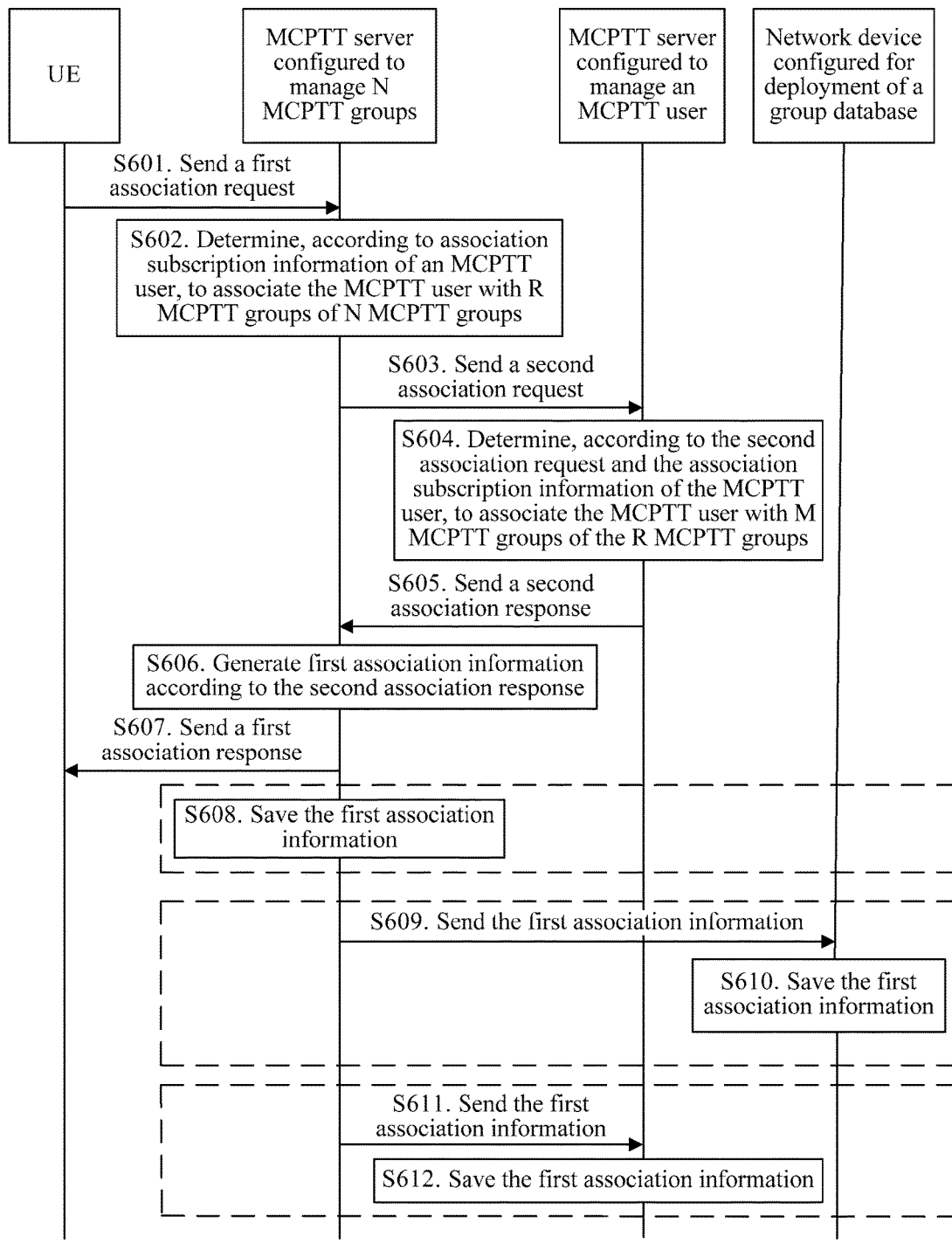
FIG. 6 is a flowchart of Embodiment 6 of a method for associating a user with a group according to the present invention.

FIG. 6 is a flowchart of Embodiment 6 of a method for associating a user with a group according to the present invention. As shown in FIG. 6, this embodiment is based on Embodiment 1 and Embodiment 3 of the method of the present invention. A first communications device is a first MCPTT server, and the first MCPTT server is an MCPTT server configured to manage N MCPTT groups; and a second communications device is UE. In this embodiment, an MCPTT server configured to manage an MCPTT group performs authorization check on a received first association request, that is, determines, according to association subscription information of an MCPTT user, which MCPTT groups in an association request the MCPTT user can be associated with. The method in this embodiment may include:

S601: The UE sends a first association request to the MCPTT server configured to manage the N MCPTT groups.

For a specific implementation process of S601 in this embodiment, reference may be made to related descriptions of Embodiment 4 of the method in the present invention, and details are not described herein again.

S602: The MCPTT server configured to manage the N MCPTT groups determines, according to the association subscription information of the MCPTT user, to associate the MCPTT user with R MCPTT groups of the N MCPTT groups.

In this embodiment, after receiving the first association request, the MCPTT server configured to manage the N MCPTT groups obtains the association subscription information of the MCPTT user according to an identifier of the MCPTT user, where the association subscription information of the MCPTT user is used to indicate an MCPTT group that the MCPTT user can be associated with. Therefore, the R MCPTT groups of the N MCPTT groups that the MCPTT user can be associated with may be determined according to the association subscription information of the MCPTT user, so as to determine to associate the MCPTT user with the R MCPTT groups of the N MCPTT groups, where $1 \leq R \leq N$, and R is an integer.

S603: The MCPTT server configured to manage the N MCPTT groups sends a second association request to an MCPTT server configured to manage the MCPTT user.

In this embodiment, after the MCPTT server configured to manage the N MCPTT groups determines to associate the R MCPTT groups of the MCPTT user with the N MCPTT groups, the MCPTT server configured to manage the N MCPTT groups sends the second association request to the MCPTT server configured to manage the MCPTT user, where the second association request includes the identifier of the MCPTT user and identifiers of the R MCPTT groups, and the second association request is used to request to associate the MCPTT user with the R MCPTT groups.

S604: The MCPTT server configured to manage the MCPTT user determines, according to the second association request and the association subscription information of the MCPTT user, to associate the MCPTT user with M MCPTT groups of the R MCPTT groups.

In this embodiment, after receiving the second association request sent by the MCPTT server configured to manage the N MCPTT groups, the MCPTT server configured to manage the MCPTT user obtains the association subscription information of the MCPTT user according to the identifier of the MCPTT user, and then determines, according to the second association request and the association subscription information of the MCPTT user, that the MCPTT user can be associated with the M MCPTT groups of the R MCPTT groups, where $1 \leq M \leq R$, and M is an integer. The M MCPTT groups are MCPTT groups that are among MCPTT groups, determined by the MCPTT server configured to manage the MCPTT user, that the MCPTT user can be associated with and also among MCPTT groups, determined by the MCPTT server configured to manage the N MCPTT groups, that the MCPTT user can be associated with.

It should be noted that, when M is not equal to R, a reason may be that the MCPTT server configured to manage the N MCPTT groups obtains the association subscription information of the MCPTT user according to group information of the N MCPTT groups, but the MCPTT server configured to manage the MCPTT user obtains the association subscription information of the MCPTT user according to subscription data of the MCPTT user. That is, although group information of some MCPTT groups indicates that the MCPTT user can be associated with these MCPTT groups, the subscription data of the MCPTT user does not indicate that the MCPTT user can be associated with these MCPTT groups.

S605: The MCPTT server configured to manage the MCPTT user sends a second association response to the MCPTT server configured to manage the N MCPTT groups.

In this embodiment, after determining to associate the MCPTT user with the M MCPTT groups of the R MCPTT groups, the MCPTT server configured to manage the MCPTT user sends the second association response to the MCPTT server configured to manage the N MCPTT groups, where the second association response is used to instruct to associate the MCPTT user with the M MCPTT groups of the R MCPTT groups.

S606: The MCPTT server configured to manage the N MCPTT groups generates first association information according to the second association response.

In this embodiment, after receiving the second association response, the MCPTT server configured to manage the N MCPTT groups determines to associate the MCPTT user with the M MCPTT groups of the R MCPTT groups, and then, generates the first association information, where the first association information is used to indicate an association relationship between the MCPTT user and the M MCPTT groups.

S607: The MCPTT server configured to manage the N MCPTT groups sends a first association response to the UE.

S608: The MCPTT server configured to manage the N MCPTT groups saves the first association information.

S609: The MCPTT server configured to manage the N MCPTT groups sends the first association information to a network device configured for deployment of a group database.

S610: The network device configured for deployment of a group database saves the first association information.

S611: The MCPTT server configured to manage the N MCPTT groups sends the first association information to the MCPTT server configured to manage the MCPTT user.

S612: The MCPTT server configured to manage the MCPTT user saves the first association information.

For specific implementation processes of S607 to S612 in this embodiment, reference may be made to related descriptions of S503 to S508 in Embodiment 5 of the method in the present invention, and details are not described herein again.

In this embodiment, UE sends a first association request to an MCPTT server configured to manage N MCPTT groups, and then the MCPTT server configured to manage the N MCPTT groups determines, by means of interaction with an MCPTT server configured to manage an MCPTT user, to associate the MCPTT user with M MCPTT groups, then, generates first association information, and sends the first association response to the UE, to notify that the MCPTT user is successfully associated with the M MCPTT groups. In this way, the MCPTT user is associated with the M MCPTT groups that the MCPTT user is interested in.

Figure 7:
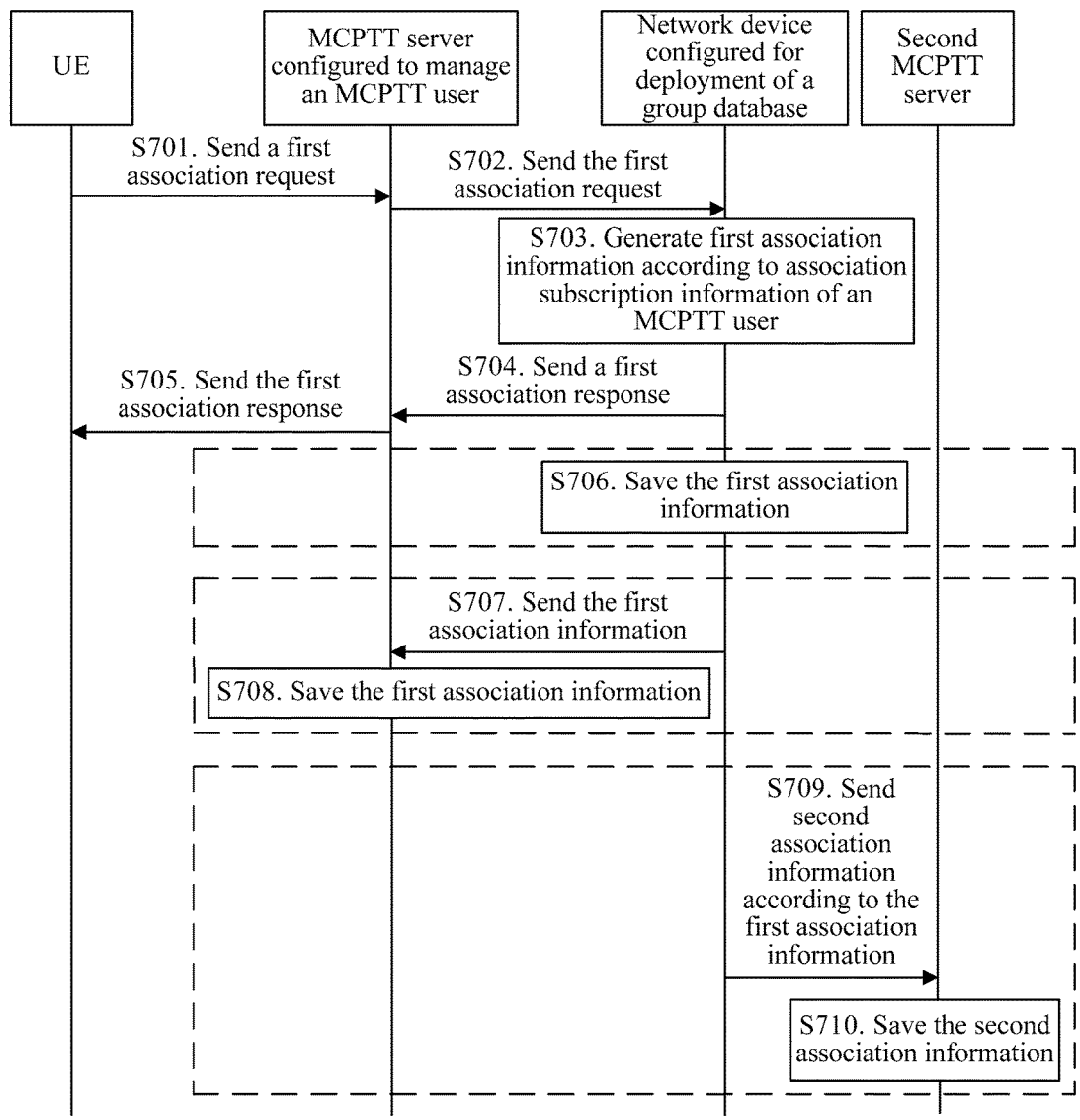
FIG. 7 is a flowchart of Embodiment 7 of a method for associating a user with a group according to the present invention.

FIG. 7 is a flowchart of Embodiment 7 of a method for associating a user with a group according to the present invention. As shown in FIG. 7, this embodiment is based on Embodiment 1 and Embodiment 3 of the method of the present invention. A first communications device is a network device configured for deployment of a group database, and a second communications device is UE. In this embodiment, the network device configured for deployment of a group database performs authorization check on a received first association request, that is, determines, according to association subscription information of an MCPTT user, which MCPTT groups in the first association request the MCPTT user can be associated with.

In this embodiment, the first association request and a first association response that are transmitted by the UE and the network device configured for deployment of a group database pass through an MCPTT server configured to manage the MCPTT user. The method in this embodiment may include:

S701: The UE sends a first association request to the MCPTT server configured to manage the MCPTT user.

For a specific implementation process of S701 in this embodiment, reference may be made to related descriptions of Embodiment 4 of the method in the present invention, and details are not described herein again.

S702: The MCPTT server configured to manage the MCPTT user sends the first association request to the network device configured for deployment of a group database.

In this embodiment, after the MCPTT server configured to manage the MCPTT user receives the first association request sent by the UE, the MCPTT server configured to manage the MCPTT user sends the first association request to the network device configured for deployment of a group database.

S703: The network device configured for deployment of a group database generates first association information according to the association subscription information of the MCPTT user.

For a specific implementation process of S703 in this embodiment, reference may be made to related descriptions of S402 in Embodiment 4 of the method in the present invention, and details are not described herein again.

S704: The network device configured for deployment of a group database sends a first association response to the MCPTT server configured to manage the MCPTT user.

In this embodiment, after the network device configured for deployment of a group database generates the first association information, the network device configured for deployment of a group database sends the first association response to the MCPTT server configured to manage the MCPTT user, where the first association response is used to indicate that the MCPTT user is successfully associated with M MCPTT groups. Optionally, the first association response is further used to indicate that the MCPTT user has failed to be associated with an MCPTT group of N MCPTT groups other than the M MCPTT groups.

S705: The MCPTT server configured to manage the MCPTT user sends the first association response to the UE.

In this embodiment, after receiving the first association response sent by the network device configured for deployment of a group database, the MCPTT server configured to manage the MCPTT user forwards the first association response to the UE. Correspondingly, after receiving the first association response, the UE completes association between the MCPTT user and the M MCPTT groups.

Optionally, after S703 is performed, that is, after the network device configured for deployment of a group database generates the first association information, the first association information further needs to be saved. This may be implemented by using the following optional implementation solutions.

In a first optional implementation solution, after S703 is performed, S706 is performed.

S706: The network device configured for deployment of a group database saves the first association information.

In this embodiment, if an association relationship between the MCPTT user and an MCPTT group needs to be saved in the network device configured for deployment of a group database, after generating the first association information, the network device configured for deployment of a group database saves the first association information.

In a second optional implementation solution, after S703 is performed, S707 and S708 are performed.

S707: The network device configured for deployment of a group database sends the first association information to the MCPTT server configured to manage the MCPTT user.

S708: The MCPTT server configured to manage the MCPTT user saves the first association information.

In this embodiment, if an association relationship between the MCPTT user and an MCPTT group needs to be saved in the MCPTT server configured to manage the MCPTT user, after generating the first association information, the network device configured for deployment of a group database sends the first association information to the MCPTT server configured to manage the MCPTT user; and the MCPTT server configured to manage the MCPTT user receives the first association information and saves the first association information.

In a third optional implementation solution, after S703 is performed, S709 and S710 are performed.

S709: The network device configured for deployment of a group database sends second association information to a second MCPTT server according to the first association information.

S710: The second MCPTT server saves the second association information.

For specific implementation processes of S709 and S710 in this embodiment, reference may be made to related descriptions of S407 and S408 in Embodiment 4 of the method in the present invention, and details are not described herein again.

It should be noted that, in an actual application, an association relationship between the MCPTT user and an MCPTT group may be stored in at least one of the following: the MCPTT server configured to manage the MCPTT user, the network device configured for deployment of a group database, or an MCPTT server configured to manage an MCPTT group; and correspondingly, at least one of the following: S706, S707 and S708, or S709 and S710 may be performed.

Optionally, before the network device configured for deployment of a group database performs S703, the network device configured for deployment of a group database determines, according to group information of the M MCPTT groups and an identifier of the MCPTT user, that the MCPTT user is an authorized MCPTT group user of the M MCPTT groups.

Optionally, before the MCPTT server configured to manage the MCPTT user performs S702, the MCPTT server configured to manage the MCPTT user determines, according to group information of the M MCPTT groups and an identifier of the MCPTT user, that the MCPTT user is an authorized MCPTT group user of the M MCPTT groups.

In this embodiment, UE sends, via an MCPTT server configured to manage an MCPTT user, a first association request to a network device configured for deployment of a group database; the network device configured for deployment of a group database generates first association information according to association subscription information of the MCPTT user, and sends a first association response to the UE via an MCPTT server configured to manage the MCPTT user, to notify that the MCPTT user is successfully associated with M MCPTT groups. In this way, the MCPTT user is associated with the M MCPTT groups that the MCPTT user is interested in.

Figure 8:
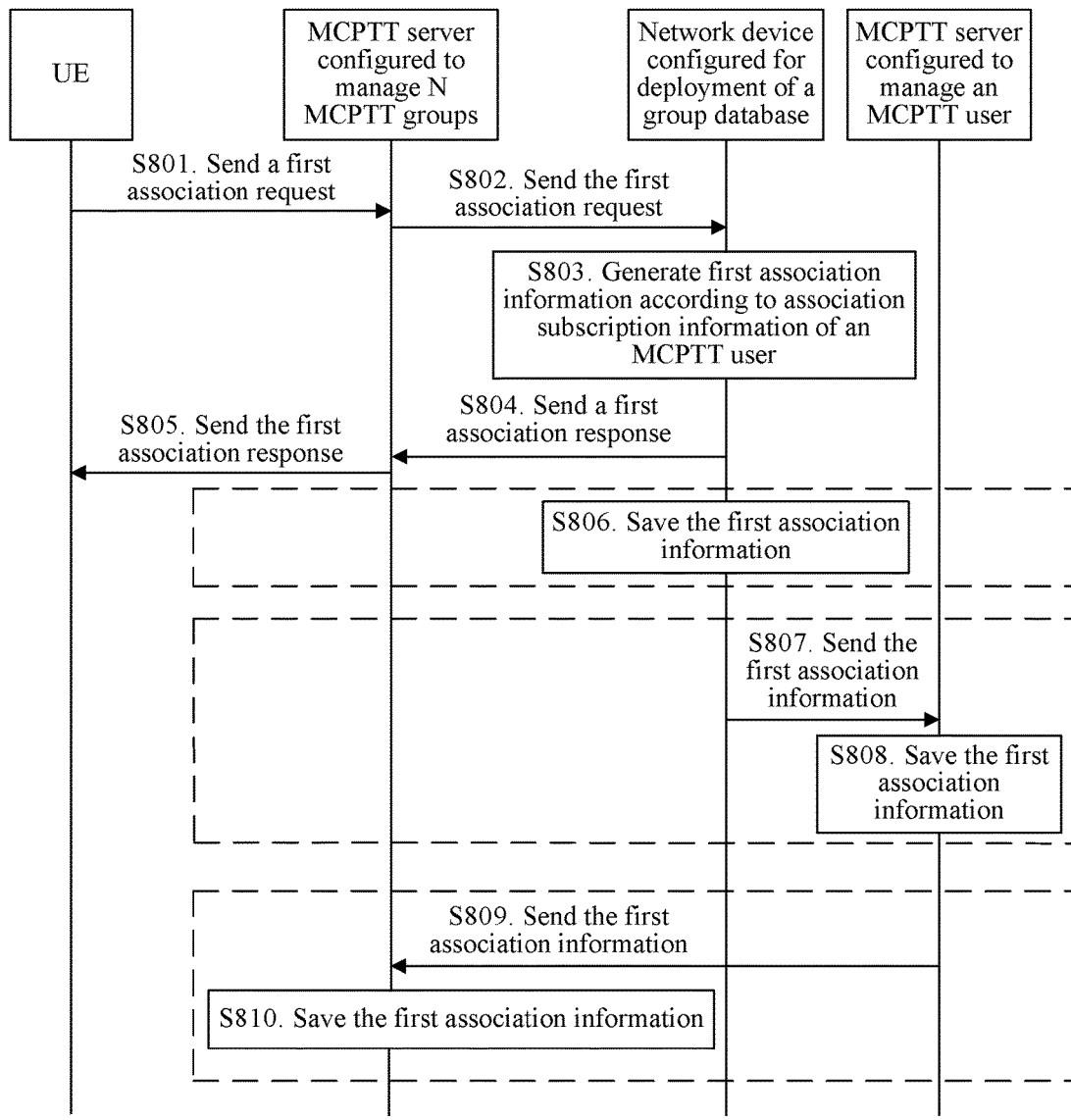
FIG. 8 is a flowchart of Embodiment 8 of a method for associating a user with a group according to the present invention.

FIG. 8 is a flowchart of Embodiment 8 of a method for associating a user with a group according to the present invention. As shown in FIG. 8, this embodiment is based on Embodiment 1 and Embodiment 3 of the method of the present invention. A first communications device is a network device configured for deployment of a group database, and a second communications device is UE. In this embodiment, the network device configured for deployment of a group database performs authorization check on a received first association request, that is, determines, according to association subscription information of an MCPTT user, which MCPTT groups in the first association request the MCPTT user can be associated with.

In this embodiment, the first association request and a first association response that are transmitted by the UE and server network device configured for deployment of a group database pass through an MCPTT server configured to manage N MCPTT groups. The method in this embodiment may include:

S801: The UE sends a first association request to the MCPTT server configured to manage the N MCPTT groups.

For a specific implementation process of S801 in this embodiment, reference may be made to related descriptions of S501 in Embodiment 5 of the method in the present invention, and details are not described herein again.

S802: The MCPTT server configured to manage the N MCPTT groups sends the first association request to the network device configured for deployment of a group database.

In this embodiment, after the MCPTT server configured to manage the N MCPTT groups receives the first association request sent by the UE, the MCPTT server configured to manage the N MCPTT groups sends the first association request to the network device configured for deployment of a group database.

S803: The network device configured for deployment of a group database generates first association information according to the association subscription information of the MCPTT user.

S804: The network device configured for deployment of a group database sends a first association response to the MCPTT server configured to manage the N MCPTT groups.

S805: The MCPTT server configured to manage the N MCPTT groups sends the first association response to the UE.

For specific implementation processes of S803 to S805 in this embodiment, reference may be made to related descriptions of S703 to S705 in Embodiment 7 of the method in the present invention, and details are not described herein again.

Optionally, after S803 is performed, that is, after the network device configured for deployment of a group database generates the first association information, the first association information further needs to be saved. This may be implemented by using the following optional implementation solutions.

In a first optional implementation solution, after S803 is performed, S806 is performed.

S806: The network device configured for deployment of a group database saves the first association information.

For a specific implementation process of S806 in this embodiment, reference may be made to related descriptions of S706 in Embodiment 7 of the method in the present invention, and details are not described herein again.

In a second optional implementation solution, after S803 is performed, S807 and S808 are performed.

S807: The network device configured for deployment of a group database sends the first association information to an MCPTT server configured to manage the MCPTT user.

S808: The MCPTT server configured to manage the MCPTT user saves the first association information.

For specific implementation processes of S807 and S808 in this embodiment, reference may be made to related descriptions of S707 and S708 in Embodiment 7 of the method in the present invention, and details are not described herein again.

In a third optional implementation solution, after S803 is performed, S809 and S810 are performed.

S809: The network device configured for deployment of a group database sends the first association information to the MCPTT server configured to manage the N MCPTT groups.

S810: The MCPTT server configured to manage the N MCPTT groups saves the first association information.

In this embodiment, if an association relationship between the MCPTT user and an MCPTT group needs to be saved in the MCPTT server configured to manage the N MCPTT groups, the network device configured for deployment of a group database sends the first association information to the MCPTT server configured to manage the N MCPTT groups, and the MCPTT server configured to manage the N MCPTT groups saves the received first association information.

It should be noted that, in an actual application, an association relationship between the MCPTT user and an MCPTT group may be stored in at least one of the following: the MCPTT server configured to manage the MCPTT user, the network device configured for deployment of a group database, or an MCPTT server configured to manage an MCPTT group; and correspondingly, at least one of the following: S806, S807 and S808, or S809 and S810 may be performed.

In addition, it should be further noted that, if the MCPTT server configured to manage the MCPTT user and the MCPTT server configured to manage the N MCPTT groups are a same MCPTT server, for the second MCPTT, the network device configured for deployment of a group database does not need to perform S811 and S812 above.

Optionally, before performing S803, the network device configured for deployment of a group database determines, according to group information of M MCPTT groups and an identifier of the MCPTT user, that the MCPTT user is an authorized MCPTT group user of the M MCPTT groups.

Optionally, before performing S702, the MCPTT server configured to manage the N MCPTT groups determines, according to group information of M MCPTT groups and an identifier of the MCPTT user, that the MCPTT user is an authorized MCPTT group user of the M MCPTT groups.

In this embodiment, UE sends, via an MCPTT server configured to manage N MCPTT groups, a first association request to a network device configured for deployment of a group database; and the network device configured for deployment of a group database generates first association information according to association subscription information of an MCPTT user, and sends a first association response to the UE via the MCPTT server configured to manage the N MCPTT groups, to notify that the MCPTT user is successfully associated with M MCPTT groups. In this way, the MCPTT user is associated with the M MCPTT groups that the MCPTT user is interested in.

Figure 9:
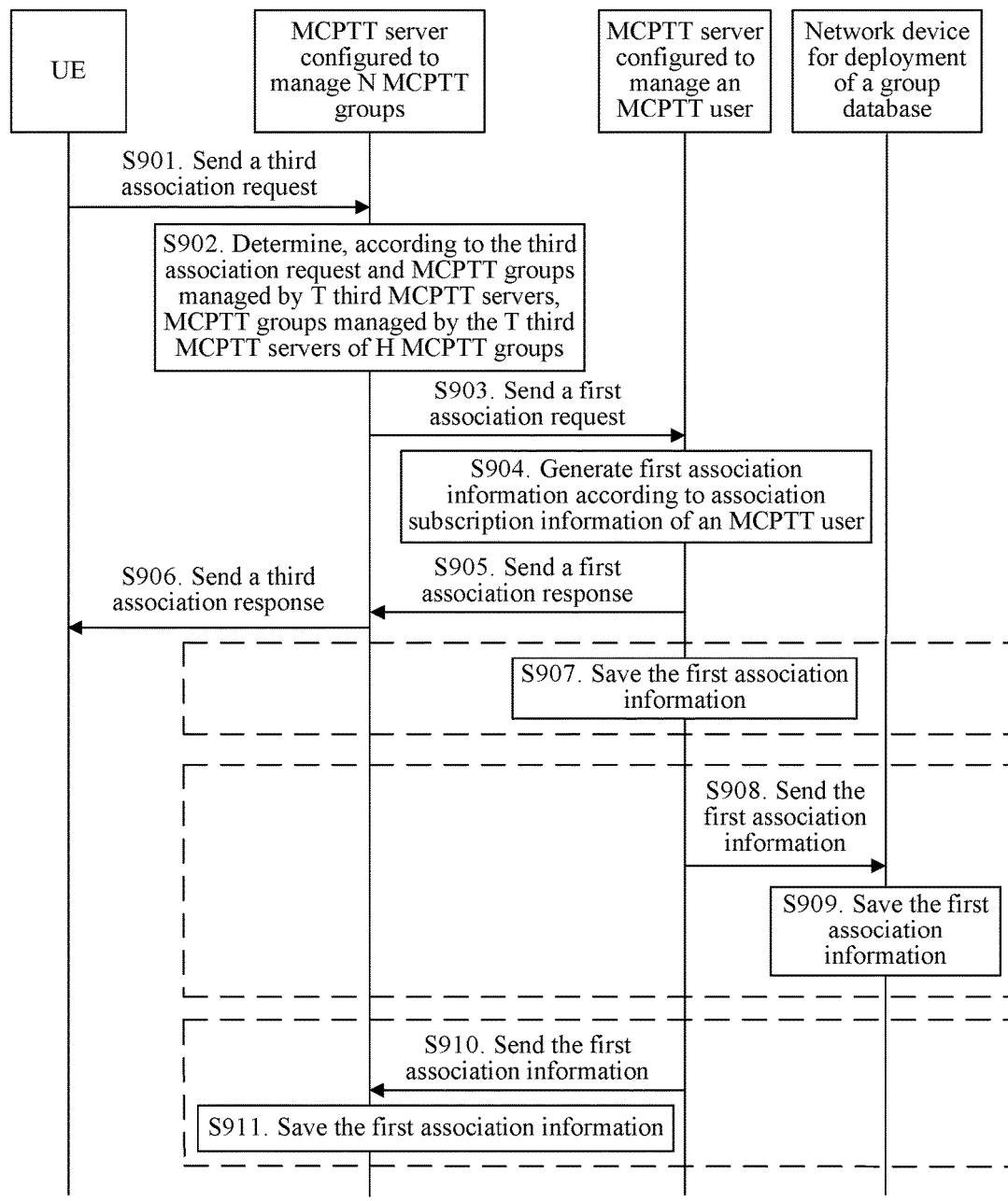
FIG. 9 is a flowchart of Embodiment 9 of a method for associating a user with a group according to the present invention.

FIG. 9 is a flowchart of Embodiment 9 of a method for associating a user with a group according to the present invention. As shown in FIG. 9, this embodiment is based on Embodiment 1 and Embodiment 3 of the method of the present invention. A first communications device is an MCPTT server configured to manage N MCPTT groups, and a second communications device is an MCPTT server configured to manage an MCPTT user. In this embodiment, an MCPTT server configured to manage an MCPTT group performs authorization check on a received first association request, that is, determines, according to association subscription information of the MCPTT user, which MCPTT groups in the first association request the MCPTT user can be associated with. The method in this embodiment may include:

S901: UE sends a third association request to the MCPTT server configured to manage the MCPTT user.

In this embodiment, when the MCPTT user initiates association with H MCPTT groups, the UE used by the MCPTT user generates a first association request, and sends the third association request to the MCPTT server configured to manage the MCPTT user, where the third association request includes an identifier of the MCPTT user and identifiers of the H MCPTT groups, the first association request is used to request to associate the MCPTT user with the H MCPTT groups, and H is an integer greater than or equal to 1.

S902: The MCPTT server configured to manage the MCPTT user determines, according to the third association request and MCPTT groups managed by T third MCPTT servers, the MCPTT groups managed by the T third MCPTT servers of the H MCPTT groups.

In this embodiment, the MCPTT server configured to manage the MCPTT user may determine MCPTT servers configured to manage the N MCPTT groups, that is, the T third MCPTT servers, so that MCPTT groups of the H MCPTT groups managed by each third MCPTT server of the T third MCPTT servers may be determined, where the MCPTT groups managed by the T third MCPTT servers include the H MCPTT groups, and each third MCPTT server manages at least one MCPTT group of the H MCPTT groups.

S903: The MCPTT server configured to manage the MCPTT user sends a first association request to the MCPTT server configured to manage the N MCPTT groups.

In this embodiment, any MCPTT server of the T third MCPTT servers is used as an example, and the any MCPTT server is the MCPTT server configured to manage the N MCPTT groups of the H MCPTT groups. The MCPTT server configured to manage the MCPTT user sends the first association request to the MCPTT server configured to manage the N MCPTT groups, where the first association request includes the identifier of the MCPTT user and identifiers of the N MCPTT groups.

S904: The MCPTT server configured to manage the N MCPTT groups generates first association information according to association subscription information of the MCPTT user.

For a specific implementation process of S904 in this embodiment, reference may be made to related descriptions of Embodiment 5 of the method in the present invention, and details are not described herein again.

S905: The MCPTT server configured to manage the N MCPTT groups sends a first association response to the MCPTT server configured to manage the MCPTT user.

In this embodiment, after generating the first association information, the MCPTT server configured to manage the N MCPTT groups sends the first association response to the MCPTT server configured to manage the MCPTT user, where the first association response is used to indicate that the MCPTT user is successfully associated with M MCPTT groups of the N MCPTT groups.

It should be noted that, only the MCPTT server (that is, one MCPTT server of the T third MCPTT servers) configured to manage the N MCPTT groups is shown in S903 to S905, and other third MCPTT servers are similar but not shown in FIG. 9.

S906: The MCPTT server configured to manage the N MCPTT groups sends a third association response to the UE.

In this embodiment, the MCPTT server configured to manage the N MCPTT groups may determine, according to the first association response sent by the T third MCPTT servers, that the MCPTT user is successfully associated with L MCPTT groups of the H MCPTT groups, and send the third association response to the UE, where the third association response is used to indicate that the MCPTT user is successfully associated with the L MCPTT groups of the H MCPTT groups, M≤L≤H, and L is an integer.

Optionally, after S904 is performed, that is, after the MCPTT server configured to manage the N MCPTT groups generates the first association information, the first association information needs to be saved. This may be implemented by using the following optional implementation solutions.

In a first optional implementation solution, after S904 is performed, S907 is performed.

S907: The MCPTT server configured to manage the N MCPTT groups saves the first association information.

For a specific implementation process of S907 in this embodiment, reference may be made to related descriptions of S504 in Embodiment 5 of the method in the present invention, and details are not described herein again.

In a second optional implementation solution, after S904 is performed, S908 and S909 are performed.

S908: The MCPTT server configured to manage the N MCPTT groups sends the first association information to a network device configured for deployment of a group database.

S909: The network device configured for deployment of a group database saves the first association information.

For specific implementation processes of S908 and S909 in this embodiment, reference may be made to related descriptions of S505 and S506 in Embodiment 5 of the method in the present invention, and details are not described herein again.

In a third optional implementation solution, after S904 is performed, S910 and S911 are performed.

S910: The MCPTT server configured to manage the N MCPTT groups sends the first association information to the MCPTT server configured to manage the MCPTT user.

S911: The MCPTT server configured to manage the MCPTT user saves the first association information.

For specific implementation processes of S910 and S911 in this embodiment, reference may be made to related descriptions of S507 and S508 in Embodiment 5 of the method in the present invention, and details are not described herein again.

In this embodiment, UE sends a third association request to an MCPTT server configured to manage an MCPTT user, and then sends a corresponding first association request to T third MCPTT servers; then, the third MCPTT servers generate first association information according to association subscription information of the MCPTT user, and send a first association response to the MCPTT server configured to manage the MCPTT user; and the MCPTT server configured to manage the MCPTT user sends a third association response to the UE according to the received first association response, to notify that the MCPTT user is successfully associated with L MCPTT groups. In this way, the MCPTT user is associated with the L MCPTT groups that the MCPTT user is interested in.

Figure 10:
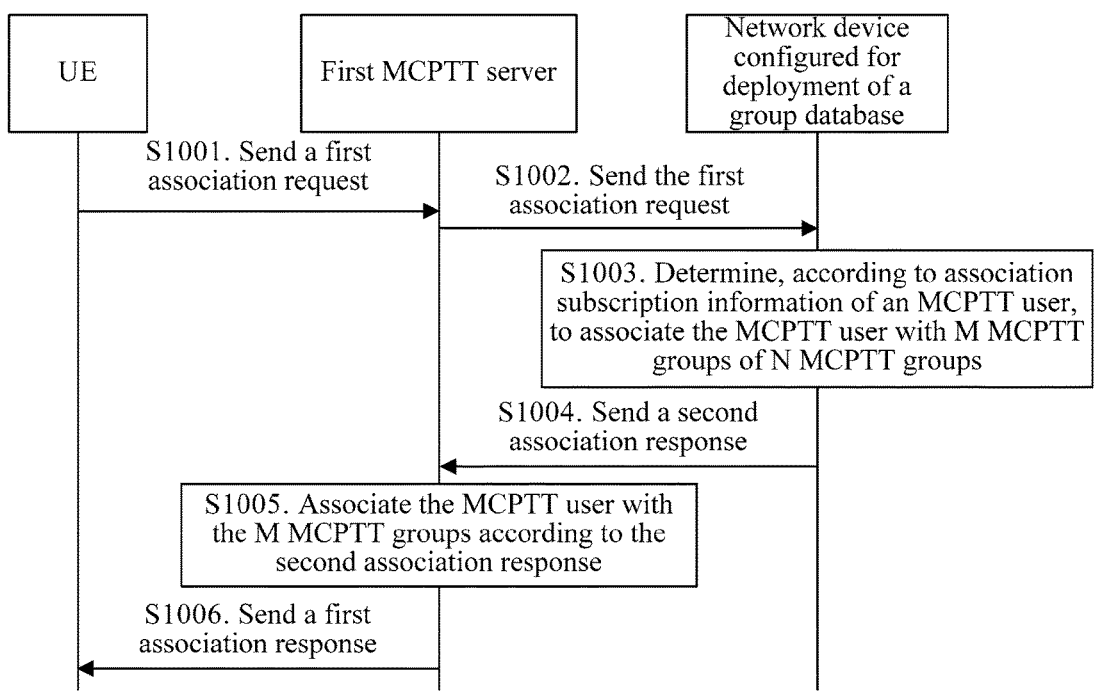
FIG. 10 is a flowchart of Embodiment 10 of a method for associating a user with a group according to the present invention.

FIG. 10 is a flowchart of Embodiment 10 of a method for associating a user with a group according to the present invention. As shown in FIG. 10, this embodiment is based on Embodiment 2 and Embodiment 3 of the method of the present invention. A first communications device is a network device configured for deployment of a group database, a second communications device is UE, and a third communications device is a first MCPTT server, where the first MCPTT server is an MCPTT server configured to manage an MCPTT user or is an MCPTT server configured to manage N MCPTT groups.

In this embodiment, the network device configured for deployment of a group database receives, via the first MCPTT server, a first association request sent by the UE. The method in this embodiment may include:

S1001: The UE sends a first association request to the first MCPTT server.

S1002: The first MCPTT server sends the first association request to the network device configured for deployment of a group database.

For specific implementation processes of S1001 and S1002 in this embodiment, reference may be made to related descriptions of Embodiment 7 or Embodiment 8 of the method in the present invention, and details are not described herein again.

S1003: The network device configured for deployment of a group database determines, according to association subscription information of the MCPTT user, to associate the MCPTT user with M MCPTT groups of the N MCPTT groups.

In this embodiment, the network device configured for deployment of a group database obtains the association subscription information of the MCPTT user, where the association subscription information of the MCPTT user is used to indicate an MCPTT group that the MCPTT user can be associated with, and may determine, according to the association subscription information of the MCPTT user, that the MCPTT user can be associated with the M MCPTT groups of the N MCPTT groups, so as to determine to associate the MCPTT user with the M MCPTT groups of the N MCPTT groups, where 1≤M≤N, and M is an integer.

Optionally, before performing S1003, the network device configured for deployment of a group database further obtains subscription data of the MCPTT user according to an identifier of the MCPTT user; and obtains the association subscription information of the MCPTT user according to the subscription data of the MCPTT user; or obtains group information of the N MCPTT groups according to identifiers of the N MCPTT groups; and obtains the association subscription information of the MCPTT user according to the group information of the N MCPTT groups and an identifier of the MCPTT user.

Optionally, before performing S1003, the network device configured for deployment of a group database further determines, according to the M MCPTT groups and the identifier of the MCPTT user, that the MCPTT user is an authorized MCPTT group user of the M MCPTT groups.

S1004: The network device configured for deployment of a group database sends a second association response to the first MCPTT server.

In this embodiment, after the network device configured for deployment of a group database determines to associate the MCPTT user with the M MCPTT groups of the N MCPTT groups, the network device configured for deployment of a group database sends the second association response to the first MCPTT server, where the second association response is used to instruct to associate the MCPTT user with the M MCPTT groups. Optionally, the second association response includes the identifier of the MCPTT user and identifiers of the M MCPTT groups.

S1005: The first MCPTT server associates the MCPTT user with the M MCPTT groups according to the second association response.

In this embodiment, a feasible implementation manner of associating, by the first MCPTT server, the MCPTT user with the M MCPTT groups according to the second association response is: generating, by the first MCPTT server, first association information according to the second association response, where the first association information is used to indicate an association relationship between the MCPTT user and the M MCPTT groups.

S1006: The first MCPTT server sends a first association response to the UE.

In this embodiment, the first MCPTT server sends the first association response to the UE according to the second association response, where the first association response is used to indicate that the MCPTT user is successfully associated with the M MCPTT groups. Correspondingly, after receiving the first association response, the UE completes association between the MCPTT user and the M MCPTT groups. Optionally, the first association response is the same as the second association response.

In this embodiment, UE sends, via a first MCPTT server, a first association request to a network device configured for deployment of a group database, and then, the network device configured for deployment of a group database determines, according to association subscription information of an MCPTT user, to associate the MCPTT user with M MCPTT groups, and sends a second association response to the first MCPTT server, so that the first MCPTT server associates the MCPTT user with the M MCPTT groups according to the second association response and sends the first association response to the UE, to notify that the MCPTT user is successfully associated with the M MCPTT groups. In this way, the MCPTT user is associated with the M MCPTT groups that the MCPTT user is interested in.

Figure 11:
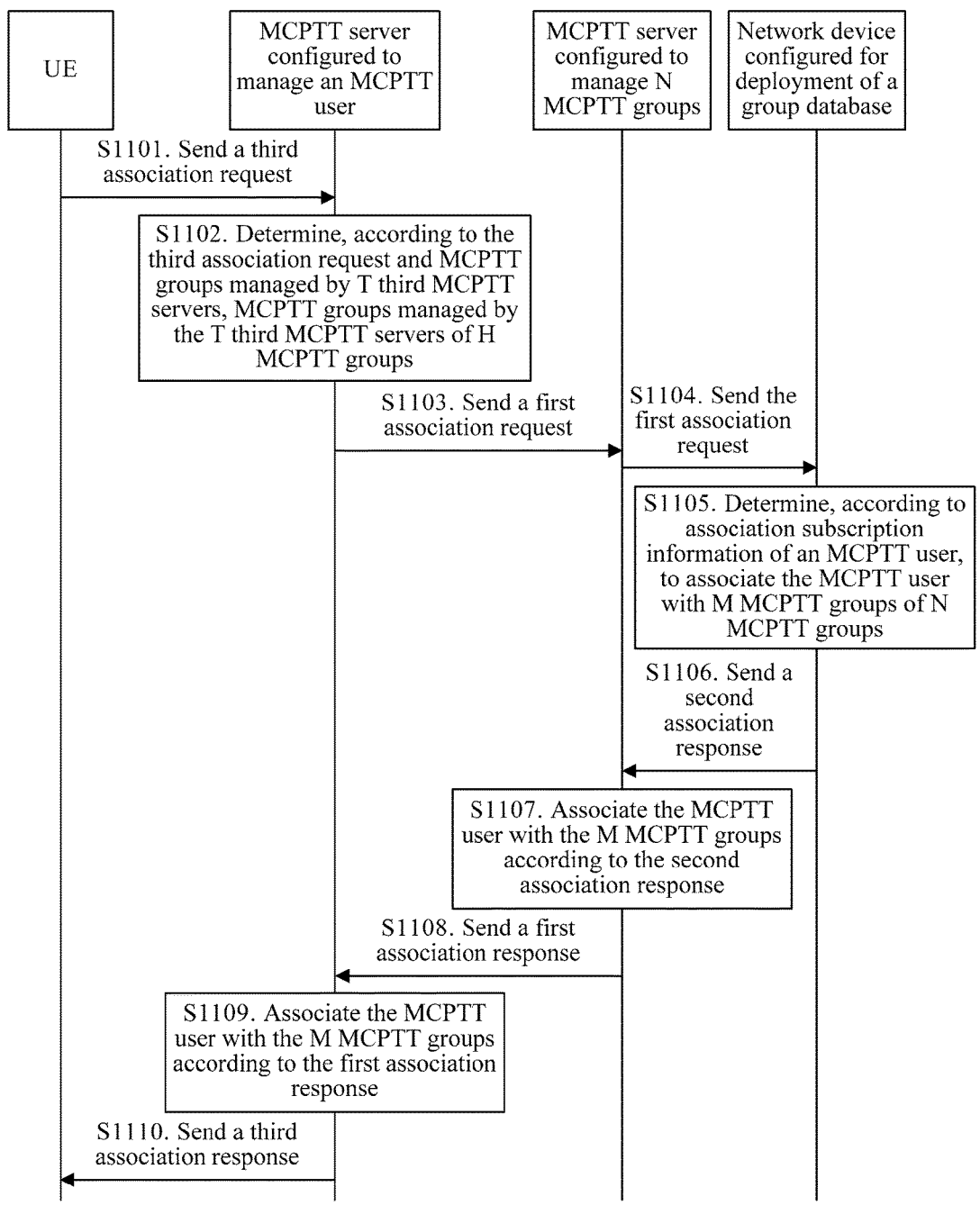
FIG. 11 is a flowchart of Embodiment 11 of a method for associating a user with a group according to the present invention.

FIG. 11 is a flowchart of Embodiment 11 of a method for associating a user with a group according to the present invention. As shown in FIG. 11, this embodiment is based on Embodiment 2 and Embodiment 3 of the method of the present invention. A first communications device is a network device configured for deployment of a group database, a second communications device is an MCPTT server configured to manage an MCPTT user, and a third communications device is an MCPTT server configured to manage N MCPTT groups. The method in this embodiment may include:

S1101: UE sends a third association request to the MCPTT server configured to manage the MCPTT user.

S1102: The MCPTT server configured to manage the MCPTT user determines, according to the third association request and MCPTT groups managed by T third MCPTT servers, the MCPTT groups managed by the T third MCPTT servers of the H MCPTT groups.

S1103: The MCPTT server configured to manage the MCPTT user sends a first association request to the MCPTT server configured to manage the N MCPTT groups.

For specific implementation processes of S1101 to S1103 in this embodiment, reference may be made to related descriptions of Embodiment 9 of the method in the present invention, and details are not described herein again.

S1104: The MCPTT server configured to manage the N MCPTT groups sends the first association request to the network device configured for deployment of a group database.

In this embodiment, after receiving the corresponding first association request, any MCPTT server of the T third MCPTT servers sends the first association request to the network device configured for deployment of a group database. Only the MCPTT server (that is, one MCPTT server of the T third MCPTT servers) configured to manage the N MCPTT groups is shown FIG. 11, and other third MCPTT servers are similar but not shown in FIG. 11.

S1105: The network device configured for deployment of a group database determines, according to association subscription information of the MCPTT user, to associate the MCPTT user with M MCPTT groups of the N MCPTT groups.

S1106: The network device configured for deployment of a group database sends a second association response to the MCPTT server configured to manage the N MCPTT groups.

For specific implementation processes of S1105 and S1106 in this embodiment, reference may be made to related descriptions of S1003 and S1004 in Embodiment 10 of the method in the present invention, and details are not described herein again.

After S1106 is performed, in a first feasible implementation manner, the MCPTT server configured to manage the N MCPTT groups associates the MCPTT user with the M MCPTT groups, that is, S1107 to S1108 and S1110 are performed.

After S1106 is performed, in a second feasible implementation manner, the MCPTT server configured to manage the MCPTT user associates the MCPTT user with the M MCPTT groups, that is, S1108 to S1110 are performed.

S1107: The MCPTT server configured to manage the N MCPTT groups associates the MCPTT user with the M MCPTT groups according to the second association response.

For a specific implementation process of S1107 in this embodiment, reference may be made to related descriptions of S1005 in Embodiment 10 of the method in the present invention, and details are not described herein again.

S1108: The MCPTT server configured to manage the N MCPTT groups sends a first association response to the MCPTT server configured to manage the MCPTT user.

In this embodiment, the MCPTT server configured to manage the N MCPTT groups sends, according to the second association response, the first association response to the MCPTT server configured to manage the MCPTT user, where the first association response is used to indicate that the MCPTT user is successfully associated with the M MCPTT groups. Optionally, the first association response is the same as the second association response.

S1109: The MCPTT server configured to manage the MCPTT user associates the MCPTT user with the M MCPTT groups according to the first association response.

In this embodiment, after receiving the first association response sent by the MCPTT server configured to manage the N MCPTT groups, the MCPTT server configured to manage the MCPTT user may further associate the MCPTT user with the M MCPTT groups according to the first association response. A feasible implementation manner is: generating, by the MCPTT server configured to manage the MCPTT user, first association information, where the first association information is used to indicate an association relationship between the MCPTT user and the M MCPTT groups.

Although only the MCPTT server (that is, one MCPTT server of the T third MCPTT servers) configured to manage the N MCPTT groups is shown in S1109 in FIG. 11, other third MCPTT servers are similar but not shown in FIG. 11.

Therefore, the MCPTT server configured to manage the MCPTT user may associate the MCPTT user with L MCPTT groups of the H MCPTT groups according to the first association response sent by the T third MCPTT servers. A manner is: generating an association relationship between the MCPTT user and the L MCPTT groups. The L MCPTT groups include the M MCPTT groups.

S1110: The MCPTT server configured to manage the MCPTT user sends a third association response to the UE.

In this embodiment, after associating the MCPTT user with the L MCPTT groups, the MCPTT server configured to manage the MCPTT user sends the third association response to the UE, where the third association response is used to indicate that the MCPTT user is successfully associated with the L MCPTT groups. Correspondingly, after receiving the third association response, the UE completes association between the MCPTT user and the L MCPTT groups.

In this embodiment, by means of the foregoing solutions, an MCPTT user is associated with M MCPTT groups that the MCPTT user is interested in.

Figure 12:
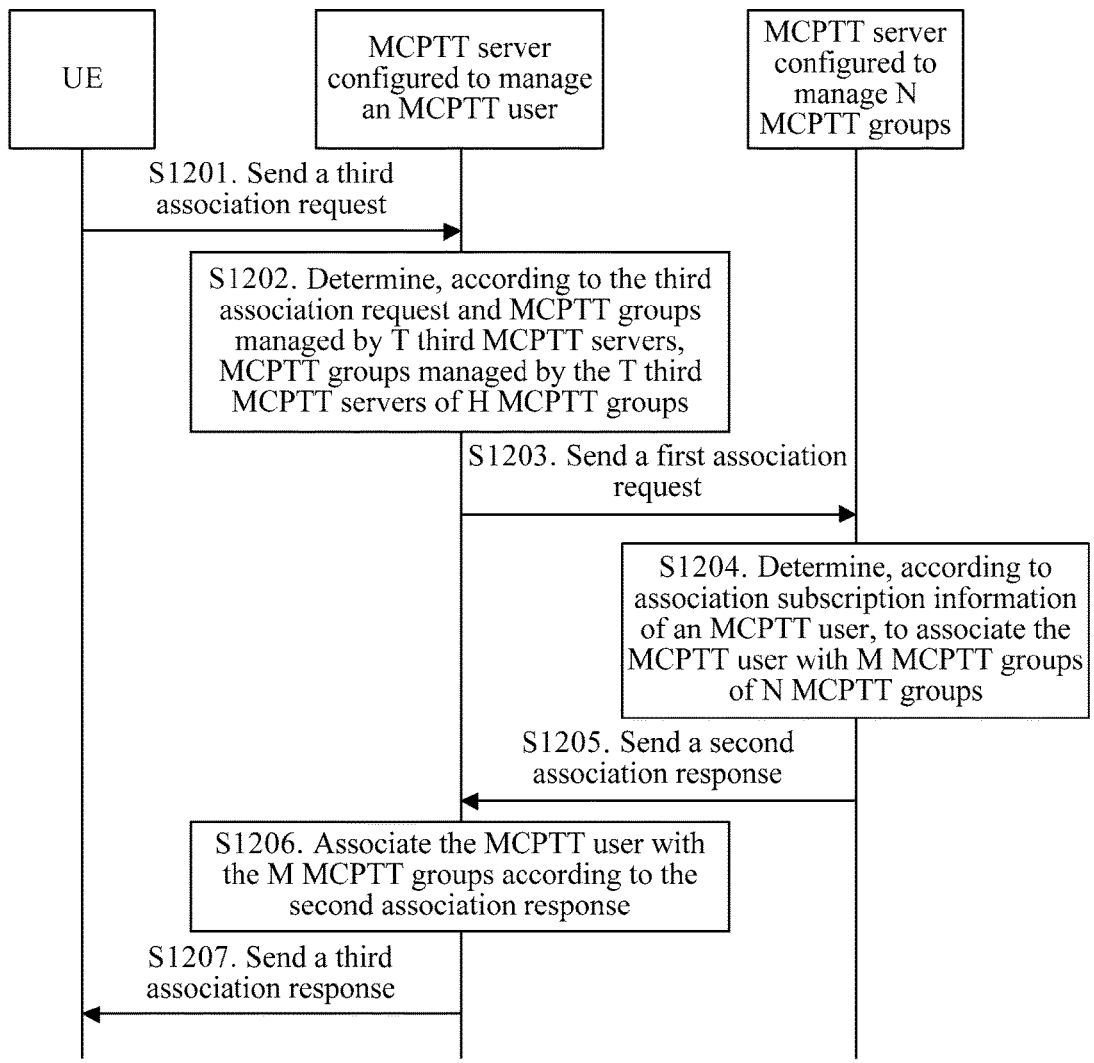
FIG. 12 is a flowchart of Embodiment 12 of a method for associating a user with a group according to the present invention.

FIG. 12 is a flowchart of Embodiment 12 of a method for associating a user with a group according to the present invention. As shown in FIG. 12, this embodiment is based on Embodiment 2 and Embodiment 3 of the method of the present invention. A first communications device is an MCPTT server configured to manage M MCPTT groups, a second communications device is UE, and a third communications device is an MCPTT server configured to manage an MCPTT user. The method in this embodiment may include:

S1201: UE sends a third association request to an MCPTT server configured to manage the MCPTT user.

S1202: The MCPTT server configured to manage the MCPTT user determines, according to the third association request and MCPTT groups managed by T third MCPTT servers, the MCPTT groups managed by the T third MCPTT servers of the H MCPTT groups.

S1203: The MCPTT server configured to manage the MCPTT user sends a first association request to an MCPTT server configured to manage N MCPTT groups.

For specific implementation processes of S1201 to S1203 in this embodiment, reference may be made to related descriptions of Embodiment 11 of the method in the present invention, and details are not described herein again.

S1204: The MCPTT server configured to manage the N MCPTT groups determines, according to association subscription information of the MCPTT user, to associate the MCPTT user with the M MCPTT groups of the N MCPTT groups.

S1205: The MCPTT server configured to manage the N MCPTT groups sends a second association response to the MCPTT server configured to manage the MCPTT user.

S1206: The MCPTT server configured to manage the MCPTT user associates the MCPTT user with the M MCPTT groups according to the second association response.

For specific implementation processes of S1204 to S1206 in this embodiment, reference may be made to related descriptions of S1003 to S1005 in Embodiment 10 of the method in the present invention, and details are not described herein again.

It should be noted that, although only the MCPTT server (that is, one MCPTT server of the T third MCPTT servers) configured to manage the N MCPTT groups is shown in FIG. 12, other third MCPTT servers are similar but not shown in FIG. 12.

S1207: The MCPTT server configured to manage the MCPTT user sends a third association response to the UE.

For a specific implementation process of S1207 in this embodiment, reference may be made to related descriptions of S1110 in Embodiment 11 of the method in the present invention, and details are not described herein again.

In this embodiment, by means of the foregoing solutions, an MCPTT user is associated with M MCPTT groups that the MCPTT user is interested in.

Figure 13:
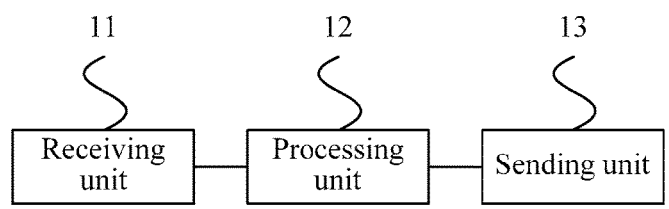
FIG. 13 is a schematic structural diagram of Embodiment 1 of a communications device according to the present invention.

FIG. 13 is a schematic structural diagram of Embodiment 1 of a communications device according to the present invention. As shown in FIG. 13, the communications device in this embodiment is used as a first communications device, and includes: a receiving unit 11, a processing unit 12, and a sending unit 13. The receiving unit 11 is configured to receive a first association request sent by a second communications device, where the first association request includes an identifier of an MCPTT user and identifiers of N MCPTT groups, the first association request is used to request to associate the MCPTT user with the N MCPTT groups, and N is an integer greater than or equal to 1. The processing unit 12 is configured to associate the MCPTT user with M MCPTT groups of the N MCPTT groups according to association subscription information of the MCPTT user, where the association subscription information of the MCPTT user is used to indicate an MCPTT group that the MCPTT user can be associated with. The sending unit 13 is configured to send a first association response to the second communications device, where the first association response is used to indicate that the MCPTT user is successfully associated with the M MCPTT groups of the N MCPTT groups, $1 \le M \le N$, and M is an integer.

Optionally, the first communications device is a network device configured for deployment of a group database; or, the first communications device is a first MCPTT server, and the first MCPTT server is an MCPTT server configured to manage the MCPTT user or is an MCPTT server configured to manage the N MCPTT groups; and the second communications device is UE.

Optionally, the first communications device is an MCPTT server configured to manage the N MCPTT groups, and the second communications device is an MCPTT server configured to manage the MCPTT user.

Optionally, when the first communications device is the MCPTT server configured to manage the N MCPTT groups, the processing unit 12 is specifically configured to:

determine, according to the association subscription information of the MCPTT user, to associate the MCPTT user with R MCPTT groups of the N MCPTT groups, where $1 \le R \le N$, and R is an integer;

send a second association request to the MCPTT server configured to manage the MCPTT user, where the second association request includes the identifier of the MCPTT user and identifiers of the R MCPTT groups, so that the MCPTT server configured to manage the MCPTT user determines, according to the second association request and the association subscription information of the MCPTT user, to associate the MCPTT user with the M MCPTT groups of the R MCPTT groups, where $1 \le M \le R$;

receive a second association response sent by the MCPTT server configured to manage the MCPTT user, where the second association response is used to instruct to associate the MCPTT user with the M MCPTT groups of the R MCPTT groups; and associate the MCPTT user with the M MCPTT groups according to the second association response.

Optionally, the processing unit 12 is specifically configured to: determine, according to the association subscription information of the MCPTT user, to associate the MCPTT user with the M MCPTT groups of the N MCPTT groups; and associate the MCPTT user with the M MCPTT groups.

Optionally, when the processing unit 12 associates the MCPTT user with the M MCPTT groups of the N MCPTT groups, the processing unit 12 is specifically configured to generate first association information, where the first association information is used to indicate an association relationship between the MCPTT user and the M MCPTT groups.

Optionally, after the processing unit 12 generates the first association information, the processing unit 12 is further configured to save the first association information.

Optionally, when the first communications device is the MCPTT server configured to manage the MCPTT user or is the MCPTT server configured to manage the N MCPTT groups, the sending unit 13 is further configured to: after the processing unit 12 generates the first association information, send the first association information to the network device configured for deployment of a group database, so that the network device configured for deployment of a group database saves the first association information; or when the first communications device is the MCPTT server configured to manage the MCPTT user or is the network device configured for deployment of a group database, the sending unit 13 is further configured to: after the processing unit 12 generates the first association information, respectively send second association information to K second MCPTT servers according to the first association information, so that each second MCPTT server saves the received second association information, where 1≤K≤M, K is an integer, MCPTT groups managed by the K second MCPTT servers include the M MCPTT groups, each second MCPTT server manages at least one MCPTT group of the M MCPTT groups, and each piece of second association information is used to indicate an association relationship between the MCPTT user and the at least one MCPTT group managed by the second MCPTT server that receives the second association information; or when the first communications device is the MCPTT server configured to manage the N MCPTT groups or is the network device configured for deployment of a group database, the sending unit 13 is further configured to: after the processing unit 12 generates the first association information, send the first association information to the MCPTT server configured to manage the MCPTT user, so that the MCPTT server configured to manage the MCPTT user saves the first association information.

Optionally, the processing unit 12 is further configured to: before the processing unit 12 associates the MCPTT user with the M MCPTT groups of the N MCPTT groups according to the association subscription information of the MCPTT user, obtain subscription data of the MCPTT user according to the identifier of the MCPTT user; and obtain the association subscription information of the MCPTT user according to the subscription data of the MCPTT user; or obtain group information of the N MCPTT groups according to the identifiers of the N MCPTT groups; and obtain the association subscription information of the MCPTT user according to the group information of the N MCPTT groups and the identifier of the MCPTT user.

Optionally, the processing unit 12 is further configured to: before the processing unit 12 associates the MCPTT user with the M MCPTT groups of the N MCPTT groups according to the association subscription information of the MCPTT user, determine, according to the group information of the M MCPTT groups and the identifier of the MCPTT user, that the MCPTT user is an authorized MCPTT group user of the M MCPTT groups.

The communications device in this embodiment may be configured to perform the solution performed by the first communications device in any embodiment of Embodiment 1 or Embodiment 3 to Embodiment 9 of the method in the present invention. Their implementation principles and technical effects are similar, and details are not described herein again.

Figure 14:
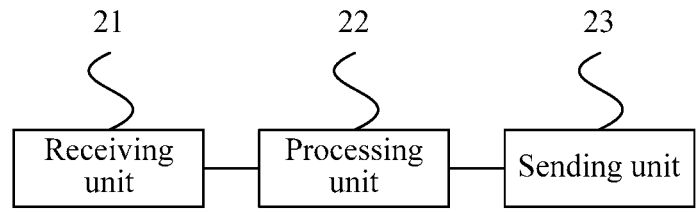
FIG. 14 is a schematic structural diagram of Embodiment 2 of a communications device according to the present invention.

FIG. 14 is a schematic structural diagram of Embodiment 2 of a communications device according to the present invention. As shown in FIG. 14, the communications device in this embodiment is used as a first communications device, and may include: a receiving unit 21, a processing unit 22, and a sending unit 23. The receiving unit 21 is configured to receive, via a third communications device, a first association request sent by a second communications device, where the first association request includes an identifier of an MCPTT user and identifiers of N MCPTT groups, the first association request is used to request to associate the MCPTT user with the N MCPTT groups, and N is an integer greater than or equal to 1. The processing unit 22 is configured to determine, according to association subscription information of the MCPTT user, to associate the MCPTT user with M MCPTT groups of the N MCPTT groups, where 1≤M≤N, and M is an integer. The sending unit 23 is configured to send a second association response to the third communications device, so that the third communications device associates the MCPTT user with the M MCPTT groups according to the second association response and sends a first association response to the second communications device, where the first association response is used to indicate that the MCPTT user is successfully associated with the M MCPTT groups.

Optionally, the second association response includes the identifier of the MCPTT user and identifiers of the M MCPTT groups.

Optionally, the second communications device is UE, the first communications device is a network device configured for deployment of a group database, and the third communications device is an MCPTT server configured to manage the MCPTT user or is an MCPTT server configured to manage the N MCPTT groups; or the second communications device is UE, the first communications device is an MCPTT server configured to manage the N MCPTT groups, and the third communications device is an MCPTT server configured to manage the MCPTT user; or the second communications device is an MCPTT server configured to manage the MCPTT user, the first communications device is a network device configured for deployment of a group database, and the third communications device is an MCPTT server configured to manage the N MCPTT groups or is the MCPTT server configured to manage the MCPTT user.

Specifically, based on the embodiment shown in FIG. 14, when the second communications device and the third communications device are a same device, that is, the MCPTT server configured to manage the MCPTT user, the receiving unit 21 is s specifically configured to receive the first association request sent by the second communications device; and the sending unit 23 is specifically configured to send the second association response to the second communications device, so that the second communications device associates the MCPTT user with the M MCPTT groups according to the second association response and generates the first association response.

For related terms such as the first association request and the first association response, reference may all be made to the descriptions of the embodiment shown in FIG. 2 or FIG. 14, and details are not described again.

Optionally, the processing unit 22 is further configured to: before the processing unit 22 determines, according to the association subscription information of the MCPTT user, to associate the MCPTT user with the M MCPTT groups of the N MCPTT groups, obtain subscription data of the MCPTT user according to the identifier of the MCPTT user; and obtain the association subscription information of the MCPTT user according to the subscription data of the MCPTT user; or obtain group information of the N MCPTT groups according to the identifiers of the N MCPTT groups; and obtain the association subscription information of the MCPTT user according to the group information of the N MCPTT groups and the identifier of the MCPTT user.

Optionally, the processing unit 22 is further configured to: before the processing unit 22 determines, according to the association subscription information of the MCPTT user, to associate the MCPTT user with the M MCPTT groups of the N MCPTT groups, determine, according to the M MCPTT groups and the identifier of the MCPTT user, that the MCPTT user is an authorized MCPTT group user of the M MCPTT groups.

The communications device in this embodiment may be configured to perform the solution performed by the first communications device in any embodiment of Embodiment 2 or Embodiment 10 to Embodiment 12 of the method in the present invention. Their implementation principles and technical effects are similar, and details are not described herein again.

Figure 15:
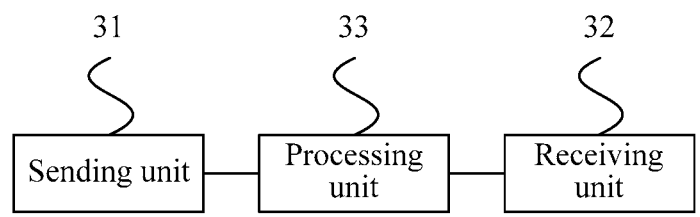
FIG. 15 is a schematic structural diagram of Embodiment 3 of a communications device according to the present invention.

FIG. 15 is a schematic structural diagram of Embodiment 3 of a communications device according to the present invention. As shown in FIG. 15, the communications device in this embodiment is used as a second communications device, and may include: a sending unit 31 and a receiving unit 32. The sending unit 31 is configured to send a first association request to a first communications device, where the first association request includes an identifier of an MCPTT user and identifiers of N MCPTT groups, the first association request is used to request to associate the MCPTT user with the N MCPTT groups, and N is an integer greater than or equal to 1. The receiving unit 32 is configured to receive a first association response sent by the first communications device, where the first association response is used to indicate that the MCPTT user is successfully associated with M MCPTT groups of the N MCPTT groups, $1 \leq M \leq N$, and M is an integer.

Optionally, the first communications device is a network device configured for deployment of a group database; or, the first communications device is a first MCPTT server, and the first MCPTT server is an MCPTT server of the MCPTT user or is an MCPTT server that manages the N MCPTT groups; and the second communications device is UE.

Optionally, when the first communications device is the MCPTT server configured to manage the N MCPTT groups or is the network device configured for deployment of a group database, the sending unit 31 is specifically configured to send the first association request to the first communications device via the MCPTT server of the MCPTT user; and the receiving unit 32 is specifically configured to receive, via the MCPTT server of the MCPTT user, the first association response sent by the first communications device.

Optionally, the first communications device is an MCPTT server configured to manage the N MCPTT groups, and the second communications device is an MCPTT server configured to manage the MCPTT user.

Optionally, the communications device in this embodiment may further include: a processing unit 33, where the receiving unit 32 is further configured to: before the sending unit 31 sends the first association request to the first communications device, receive a third association request sent by UE, where the third association request includes the identifier of the MCPTT user and identifiers of H MCPTT groups, the third association request is used to request to associate the MCPTT user with the H MCPTT groups, H is an integer greater than or equal to 1, and the H MCPTT groups include the N MCPTT groups;

the processing unit 33 is configured to determine, according to the third association request and MCPTT groups managed by T third MCPTT servers, the MCPTT groups managed by the T third MCPTT servers of the H MCPTT groups, where the MCPTT groups managed by the T third MCPTT servers include the H MCPTT groups, each third MCPTT server manages at least one MCPTT group of the H MCPTT groups, and the first communications device is any MCPTT server of the T third MCPTT servers; and the sending unit 31 is further configured to: after the receiving unit 32 receives the first association response sent by the first communications device, send a third association response to the UE according to the first association response, where the third association response is used to indicate that the MCPTT user is successfully associated with L MCPTT groups of the H MCPTT groups, $M \leq L \leq H$, and L is an integer.

The communications device in this embodiment may be configured to perform the solution performed by the second communications device in the foregoing embodiments of the method in the present invention. Their implementation principles and technical effects are similar, and details are not described herein again.

Figure 16:
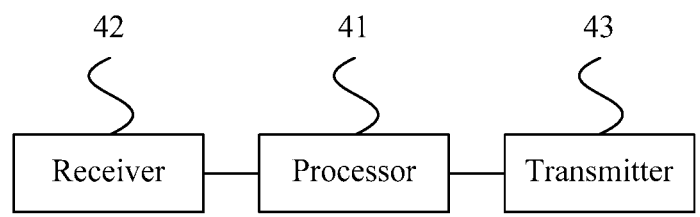
FIG. 16 is a schematic structural diagram of Embodiment 4 of a communications device according to the present invention.

FIG. 16 is a schematic structural diagram of Embodiment 4 of a communications device according to the present invention. As shown in FIG. 16, the communications device in this embodiment is used as a first communications device, and may include: a processor 41, a receiver 42, and a transmitter 43. The processor 41 is configured to: receive, via the receiver 42, a first association request sent by a second communications device, where the first association request includes an identifier of an MCPTT user and identifiers of N MCPTT groups, the first association request is used to request to associate the MCPTT user with the N MCPTT groups, and N is an integer greater than or equal to 1; associate the MCPTT user with M MCPTT groups of the N MCPTT groups according to association subscription information of the MCPTT user, where the association subscription information of the MCPTT user is used to indicate an MCPTT group that the MCPTT user can be associated with; and send, via the transmitter 43, a first association response to the second communications device, where the first association response is used to indicate that the MCPTT user is successfully associated with the M MCPTT groups of the N MCPTT groups, $1 \le M \le N$, and M is an integer.

Optionally, the first communications device is a network device configured for deployment of a group database; or, the first communications device is a first MCPTT server, and the first MCPTT server is an MCPTT server configured to manage the MCPTT user or is an MCPTT server configured to manage the N MCPTT groups; and the second communications device is UE.

Optionally, the first communications device is an MCPTT server configured to manage the N MCPTT groups, and the second communications device is an MCPTT server configured to manage the MCPTT user.

Optionally, when the first communications device is the MCPTT server configured to manage the N MCPTT groups, when the processor 41 associates the MCPTT user with the M MCPTT groups of the N MCPTT groups according to the association subscription information of the MCPTT user, the processor 41 is specifically configured to: determine, according to the association subscription information of the MCPTT user, to associate the MCPTT user with R MCPTT groups of the N MCPTT groups, where $1 \le R \le N$, and R is an integer;

send, via the transmitter 43, a second association request to the MCPTT server configured to manage the MCPTT user, where the second association request includes the identifier of the MCPTT user and identifiers of the R MCPTT groups, so that the MCPTT server configured to manage the MCPTT user determines, according to the second association request and the association subscription information of the MCPTT user, to associate the MCPTT user with the M MCPTT groups of the R MCPTT groups, where $1 \le M \le R$;

receive, via the receiver 42, a second association response sent by the MCPTT server configured to manage the MCPTT user, where the second association response is used to instruct to associate the MCPTT user with the M MCPTT groups of the R MCPTT groups; and associate the MCPTT user with the M MCPTT groups according to the second association response.

Optionally, when the processor 41 associates the MCPTT user with the M MCPTT groups of the N MCPTT groups according to the association subscription information of the MCPTT user, the processor 41 is specifically configured to: determine, according to the association subscription information of the MCPTT user, to associate the MCPTT user with the M MCPTT groups of the N MCPTT groups; and associate the MCPTT user with the M MCPTT groups.

Optionally, when the processor 41 associates the MCPTT user with the M MCPTT groups of the N MCPTT groups, the processor 41 is specifically configured to generate first association information, where the first association information is used to indicate an association relationship between the MCPTT user and the M MCPTT groups.

Optionally, after the processor 41 generates the first association information, the processor 41 is further configured to saves the first association information.

Optionally, when the first communications device is the MCPTT server configured to manage the MCPTT user or is the MCPTT server configured to manage the N MCPTT groups, the processor 41 is further configured to: after the processor 41 generates the first association information, send, via transmitter 43, the first association information to the network device configured for deployment of a group database, so that the network device configured for deployment of a group database saves the first association information; or when the first communications device is the MCPTT server configured to manage the MCPTT user or is the network device configured for deployment of a group database, the processor 41 is further configured to: after the processor 41 generates the first association information, respectively send, via the transmitter 43, second association information to K second MCPTT servers according to the first association information, so that each second MCPTT server saves the received second association information, where $1 \le K \le M$, K is an integer, MCPTT groups managed by the K second MCPTT servers include the M MCPTT groups, each second MCPTT server manages at least one MCPTT group of the M MCPTT groups, and each piece of second association information is used to indicate an association relationship between the MCPTT user and the at least one MCPTT group managed by the second MCPTT server that receives the second association information; or when the first communications device is the MCPTT server configured to manage the N MCPTT groups or is the network device configured for deployment of a group database, the processor 41 is further configured to: after the processor 41 generates the first association information, send, via transmitter 43, the first association information to the MCPTT server configured to manage the MCPTT user, so that the MCPTT server configured to manage the MCPTT user saves the first association information.

Optionally, the processor 41 is further configured to: before the processor 41 associates the MCPTT user with the M MCPTT groups of the N MCPTT groups according to the association subscription information of the MCPTT user, obtain subscription data of the MCPTT user according to the identifier of the MCPTT user; and obtain the association subscription information of the MCPTT user according to the subscription data of the MCPTT user; or obtain group information of the N MCPTT groups according to the identifiers of the N MCPTT groups; and obtain the association subscription information of the MCPTT user according to the group information of the N MCPTT groups and the identifier of the MCPTT user.

Optionally, the processor 41 is further configured to: before the processor 41 associates the MCPTT user with the M MCPTT groups of the N MCPTT groups according to the association subscription information of the MCPTT user, determine, according to the group information of the M MCPTT groups and the identifier of the MCPTT user, that the MCPTT user is an authorized MCPTT group user of the M MCPTT groups.

The communications device in this embodiment may be configured to perform the solution performed by the first communications device in any embodiment of Embodiment 1 or Embodiment 3 to Embodiment 9 of the method in the present invention. Their implementation principles and technical effects are similar, and details are not described herein again.

Figure 17:
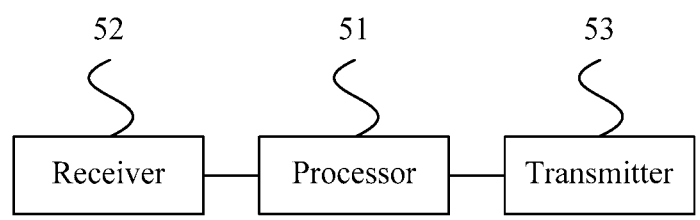
FIG. 17 is a schematic structural diagram of Embodiment 5 of a communications device according to the present invention.

FIG. 17 is a schematic structural diagram of Embodiment 5 of a communications device according to the present invention. As shown in FIG. 17, the communications device in this embodiment is used as a first communications device, and may include: a processor 51, a receiver 52, and a transmitter 53. The processor 51 is configured to: receive, via the receiver 52, a first association request sent by a second communications device, where the first association request includes an identifier of an MCPTT user and identifiers of N MCPTT groups, the first association request is used to request to associate the MCPTT user with the N MCPTT groups, and N is an integer greater than or equal to 1; determine, according to association subscription information of the MCPTT user, to associate the MCPTT user with M MCPTT groups of the N MCPTT groups, where 1≤M≤N, and M is an integer; and send, via the transmitter 53, a second association response to a third communications device, so that the third communications device associates the MCPTT user with the M MCPTT groups according to the second association response and sends a first association response to the second communications device, where the first association response is used to indicate that the MCPTT user is successfully associated with the M MCPTT groups.

Optionally, the second association response includes the identifier of the MCPTT user and identifiers of the M MCPTT groups.

Optionally, the second communications device is UE, the first communications device is a network device configured for deployment of a group database, and the third communications device is an MCPTT server configured to manage the MCPTT user or is an MCPTT server configured to manage the N MCPTT groups; or the second communications device is UE, the first communications device is an MCPTT server configured to manage the N MCPTT groups, and the third communications device is an MCPTT server configured to manage the MCPTT user; or the second communications device is an MCPTT server configured to manage the MCPTT user, the first communications device is a network device configured for deployment of a group database, and the third communications device is an MCPTT server configured to manage the N MCPTT groups or is the MCPTT server configured to manage the MCPTT user.

Optionally, the processor 51 is further configured to: before the processor 51 determines, according to the association subscription information of the MCPTT user, to associate the MCPTT user with the M MCPTT groups of the N MCPTT groups, obtain subscription data of the MCPTT user according to the identifier of the MCPTT user; and obtain the association subscription information of the MCPTT user according to the subscription data of the MCPTT user; or obtain group information of the N MCPTT groups according to the identifiers of the N MCPTT groups; and obtain the association subscription information of the MCPTT user according to the group information of the N MCPTT groups and the identifier of the MCPTT user.

Optionally, the processor 51 is further configured to: before the processor 51 determines, according to the association subscription information of the MCPTT user, to associate the MCPTT user with the M MCPTT groups of the N MCPTT groups, determine, according to the M MCPTT groups and the identifier of the MCPTT user, that the MCPTT user is an authorized MCPTT group user of the M MCPTT groups.

The communications device in this embodiment may be configured to perform the solution performed by the first communications device in any embodiment of Embodiment 2 or Embodiment 10 to Embodiment 12 of the method in the present invention, implementation principles and technical effects are similar. Their and details are not described herein again.

Figure 18:
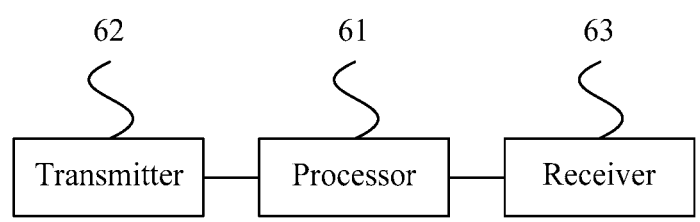
FIG. 18 is a schematic structural diagram of Embodiment 6 of a communications device according to the present invention.

FIG. 18 is a schematic structural diagram of Embodiment 6 of a communications device according to the present invention. As shown in FIG. 18, the communications device in this embodiment is used as a second communications device, and may include: a processor 61, a transmitter 62, and a receiver 63. The processor 61 is configured to: send, via the transmitter 62 of the second communications device, a first association request to a first communications device, where the first association request includes an identifier of an MCPTT user and identifiers of N MCPTT groups, the first association request is used to request to associate the MCPTT user with the N MCPTT groups, and N is an integer greater than or equal to 1; and receive, via the receiver 63, a first association response sent by the first communications device, where the first association response is used to indicate that the MCPTT user is successfully associated with M MCPTT groups of the N MCPTT groups, 1≤M≤N, and M is an integer.

Optionally, the first communications device is a network device configured for deployment of a group database; or, the first communications device is a first MCPTT server, and the first MCPTT server is an MCPTT server of the MCPTT user or is an MCPTT server that manages the N MCPTT groups; and the second communications device is UE.

Optionally, when the first communications device is the MCPTT server configured to manage the N MCPTT groups or is the network device configured for deployment of a group database, when the processor sends, via the transmitter 62, the first association request to the first communications device, the processor 61 is specifically configured to send, via the transmitter 62, the first association request to the first communications device via the MCPTT server of the MCPTT user.

When the processor 61 receives, via the receiver 63, the first association response sent by the first communications device, the processor 61 is specifically configured to receive, via the receiver 63, via the MCPTT server of the MCPTT user, the first association response sent by the first communications device.

Optionally, the first communications device is an MCPTT server configured to manage the N MCPTT groups, and the second communications device is an MCPTT server configured to manage the MCPTT user.

Optionally, the processor 61 is further configured to: before the processor 61 sends, via the transmitter 62, the first association request to the first communications device, receive, via the receiver 63, a third association request sent by UE, where the third association request includes the identifier of the MCPTT user and identifiers of H MCPTT groups, the third association request is used to request to associate the MCPTT user with the H MCPTT groups, H is an integer greater than or equal to 1, and the H MCPTT groups include the N MCPTT groups; and determine, according to the third association request and MCPTT groups managed by T third MCPTT servers, the MCPTT groups managed by the T third MCPTT servers of the H MCPTT groups, where the MCPTT groups managed by the T third MCPTT servers include the H MCPTT groups, each third MCPTT server manages at least one MCPTT group of the H MCPTT groups, and the first communications device is any MCPTT server of the T third MCPTT servers; and the processor 61 is further configured to: after the processor 61 receives, via the receiver 63, the first association response sent by the first communications device, send, via the transmitter 62, a third association response to the UE according to the first association response, where the third association response is used to indicate that the MCPTT user is successfully associated with L MCPTT groups of the H MCPTT groups, M≤L≤H, and L is an integer.

The communications device in this embodiment may be configured to perform the solution performed by the second communications device in the foregoing embodiments of the method in the present invention. Their implementation principles and technical effects are similar, and details are not described herein again.

It should be noted that, the foregoing network device configured for deployment of a group database is a functional entity and mainly stores some group related information such as group configuration data and subscription related information and may perform authorized operation processing on data stored in the network device. Optionally, another function may be further deployed on the network device configured for deployment of a group database, and the another function is not limited herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM for short), a random access memory (RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for associating a user with a group, comprising:
   receiving, by a first communications device, a first association request from a second communications device, wherein the first association request comprises an identifier of a mission critical push to talk over (MCPTT) user and identifiers of N MCPTT groups, the first association request is used to request to associate the MCPTT user with the N MCPTT groups, and N is an integer greater than or equal to 1;
   associating, by the first communications device, the MCPTT user with M MCPTT groups of the N MCPTT groups according to association subscription information of the MCPTT user, wherein the association subscription information of the MCPTT user is used to indicate an MCPTT group that the MCPTT user can be associated with; and
   sending, by the first communications device, a first association response to the second communications device, wherein the first association response is used to indicate that the MCPTT user is successfully associated with the M MCPTT groups of the N MCPTT groups, 1≤M≤N, and M is an integer.

2. The method according to claim 1, wherein the first communications device is a network device configured for deployment of a group database; or, the first communications device is a first MCPTT server, and the first MCPTT server is an MCPTT server configured to manage the MCPTT user or the N MCPTT groups; and the second communications device is user equipment (UE).

3. The method according to claim 1, wherein the associating, by the first communications device, the MCPTT user with M MCPTT groups of the N MCPTT groups comprises:
   generating, by the first communications device, first association information, wherein the first association information is used to indicate an association relationship between the MCPTT user and the M MCPTT groups.

4. The method according to claim 1, before the associating, by the first communications device, the MCPTT user with M MCPTT groups of the N MCPTT groups according to association subscription information of the MCPTT user, further comprising:
   obtaining, by the first communications device, subscription data of the MCPTT user according to the identifier of the MCPTT user; and obtaining the association subscription information of the MCPTT user according to the subscription data of the MCPTT user.

5. The method according to claim 1, before the associating, by the first communications device, the MCPTT user with M MCPTT groups of the N MCPTT groups according to association subscription information of the MCPTT user, further comprising:
   obtaining, by the first communications device, group information of the N MCPTT groups according to the identifiers of the N MCPTT groups; and obtaining the association subscription information of the MCPTT user according to the group information of the N MCPTT groups and the identifier of the MCPTT user.

6. A method for associating a user with a group, comprising:
   sending, by a second communications device, a first association request to a first communications device, wherein the first association request comprises an identifier of a mission critical push to talk over (MCPTT) user and identifiers of N MCPTT groups, the first association request is used to request to associate the MCPTT user with the N MCPTT groups, and N is an integer greater than or equal to 1; and
   receiving, by the second communications device, a first association response from the first communications device, wherein the first association response is used to indicate that the MCPTT user is successfully associated with M MCPTT groups of the N MCPTT groups, 1≤M≤N, and M is an integer.

7. The method according to claim 6, wherein the first communications device is a network device configured for deployment of a group database; or, the first communications device is a first MCPTT server, and the first MCPTT server is an MCPTT server of the MCPTT user or the N MCPTT groups; and the second communications device is user equipment (UE).

8. A communications device, used as a first communications device, and comprising: a processor, a receiver and a transmitter;
   wherein the processor is configured to:
   receive, via the receiver, a first association request from a second communications device, wherein the first association request comprises an identifier of a mission critical push to talk over (MCPTT) user and identifiers of N MCPTT groups, the first association request is used to request to associate the MCPTT user with the N MCPTT groups, and N is an integer greater than or equal to 1;

associate the MCPTT user with M MCPTT groups of the N MCPTT groups according to association subscription information of the MCPTT user, wherein the association subscription information of the MCPTT user is used to indicate an MCPTT group that the MCPTT user can be associated with; and send, via the transmitter, a first association response to the second communications device, wherein the first association response is used to indicate that the MCPTT user is successfully associated with the M MCPTT groups of the N MCPTT groups, $1 \leq M \leq N$, and M is an integer.

9. The communications device according to claim 8, wherein the first communications device is a network device configured for deployment of a group database; or, the first communications device is a first MCPTT server, and the first MCPTT server is an MCPTT server configured to manage the MCPTT user or the N MCPTT groups; and the second communications device is user equipment (UE).

10. The communications device according to claim 8, wherein when the processor associates the MCPTT user with the M MCPTT groups of the N MCPTT groups, the processor is configured to generate first association information, wherein the first association information is used to indicate an association relationship between the MCPTT user and the M MCPTT groups.

11. A communications device, used as a second communications device, and comprising: a processor, a transmitter and a receiver;

wherein the processor is configured to:

send, via the transmitter, a first association request to a first communications device, wherein the first association request comprises an identifier of a mission critical push to talk over (MCPTT) user and identifiers of N MCPTT groups, the first association request is used to request to associate the MCPTT user with the N MCPTT groups, and N is an integer greater than or equal to 1; and receive, via the receiver, a first association response from the first communications device, wherein the first association response is used to indicate that the MCPTT user is successfully associated with M MCPTT groups of the N MCPTT groups, $1 \leq M \leq N$, and M is an integer.

12. The communications device according to claim 11, wherein the first communications device is a network device configured for deployment of a group database; or, the first communications device is a first MCPTT server, and the first MCPTT server is an MCPTT server of the MCPTT user or the N MCPTT groups; and the second communications device is user equipment (UE).

13. The communications device according to claim 12, wherein when the first communications device is the first MCPTT server configured to manage the N MCPTT groups or is the network device configured for deployment of the group database, the processor is configured to send the first association request to the first communications device via the MCPTT server of the MCPTT user; and the processor is configured to receive, via the MCPTT server of the MCPTT user, the first association response from the first communications device.

* * * * *